US012641495B2

(12) United States Patent
Xu et al.

(10) Patent No.: US 12,641,495 B2
(45) Date of Patent: May 26, 2026

(54) METHOD AND APPARATUS FOR HANDLING MOBILITY IN DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Jongwoo Hong, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 920 days.

(21) Appl. No.: 17/797,414

(22) PCT Filed: Feb. 8, 2021

(86) PCT No.: PCT/KR2021/001635
§ 371 (c)(1),
(2) Date: Aug. 3, 2022

(87) PCT Pub. No.: WO2021/158089
PCT Pub. Date: Aug. 12, 2021

(65) Prior Publication Data
US 2023/0071268 A1       Mar. 9, 2023

(30) Foreign Application Priority Data
Feb. 7, 2020     (KR) ........................ 10-2020-0015129

(51) Int. Cl.
*H04W 36/00*          (2009.01)
*H04W 36/36*          (2009.01)
*H04W 74/0833*      (2024.01)
(52) U.S. Cl.
CPC ..... *H04W 36/0027* (2013.01); *H04W 36/362* (2023.05); *H04W 74/0833* (2013.01)

(58) Field of Classification Search
CPC ........... H04W 36/0027; H04W 36/362; H04W 74/0833
(Continued)

(56) References Cited

U.S. PATENT DOCUMENTS 10,264,622 B2     4/2019   Park et al.
2018/0302834 A1*  10/2018  Zhang ............... H04W 36/0027
(Continued)

FOREIGN PATENT DOCUMENTS

KR       1020180093454       8/2018

OTHER PUBLICATIONS

Huawei, Conditional SN Change in MR-DC, R3-195587, 3GPP TSG-RAN3 Meeting #105bis, Chongqing, China, Oct. 5, 2019, sections 10.2.1, 10.3.2, 10.5.1; and figure 10.2.1-1.
(Continued)

*Primary Examiner* — Faruk Hamza
*Assistant Examiner* — Jean F Voltaire
(74) *Attorney, Agent, or Firm* — BRYAN CAVE LEIGHTON PAISNER LLP

(57)                    ABSTRACT

The present disclosure relates to handling mobility in dual connectivity in wireless communication system. According to various embodiments, a method performed by a target secondary node (SN) for a primary secondary cell (PSCell) mobility of a wireless device from a source SN in a wireless communication system comprises: receiving, from a master node (MN), a message for informing a trigger of the PSCell mobility; obtaining inactivity status information informing that the wireless device is in an inactive state; and releasing or suspending lower layers for a communication with the wireless device based on the inactivity status information after the PSCell mobility of the wireless device to the target SN is completed, wherein the lower layers comprises at least
(Continued)

one of a physical (PHY) layer, a media access control (MAC) layer, or a radio link control (RLC) layer.

13 Claims, 20 Drawing Sheets

(58) Field of Classification Search
 USPC ......................................................... 370/331
 See application file for complete search history.

(56)                    References Cited

U.S. PATENT DOCUMENTS

| 2019/0364462 | A1 | 11/2019 | Kim et al. | |
| 2020/0029389 | A1 | 1/2020 | Yilmaz et al. | |
| 2020/0267631 | A1* | 8/2020 | Yilmaz | H04W 48/20 |
| 2022/0104301 | A1* | 3/2022 | Wu | H04W 76/16 |
| 2023/0046878 | A1* | 2/2023 | Hsieh | H04W 36/0085 |
| 2023/0164867 | A1* | 5/2023 | Cheng | H04W 76/27 |
| | | | | 370/252 |

OTHER PUBLICATIONS

CATT, Report on Offline Discussion [108] agreeable proposals on Conditional PSCell Addition/Change, R2-1916321, 3GPP TSG-RAN WG2 Meeting #108, Reno, NV, USA, Nov. 23, 2019, section 3.

Intel Corporation et al., Correcting misbehaviors and clean-ups on 37.340 related to data forwarding and SN status transfer, R2-1916617, 3GPP TSG-RAN WG2 Meeting #108, Reno, NV, USA, Nov. 29, 2019, section 10.7.2.

RP-193249, 3GPP TSG RAN Meeting #86, Sitges, Spain, Dec. 9-12, 2019.

Rp-201040, 3GPP TSG RAN Meeting #88e, Electronic Meeting, Jun. 29-Jul. 3, 2020.

3GPP TS 37.340 V16.0.0, Dec. 2019.

* cited by examiner

Figure 3:
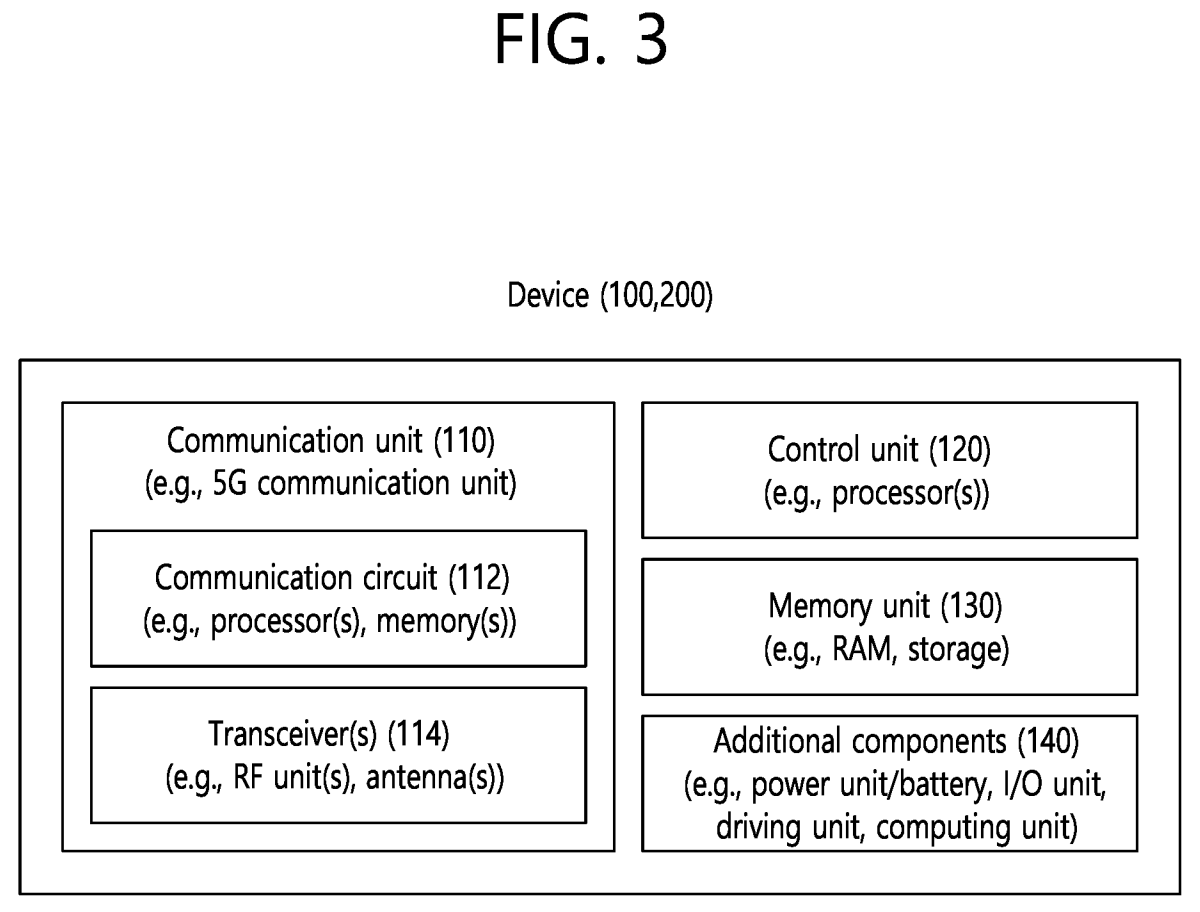

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

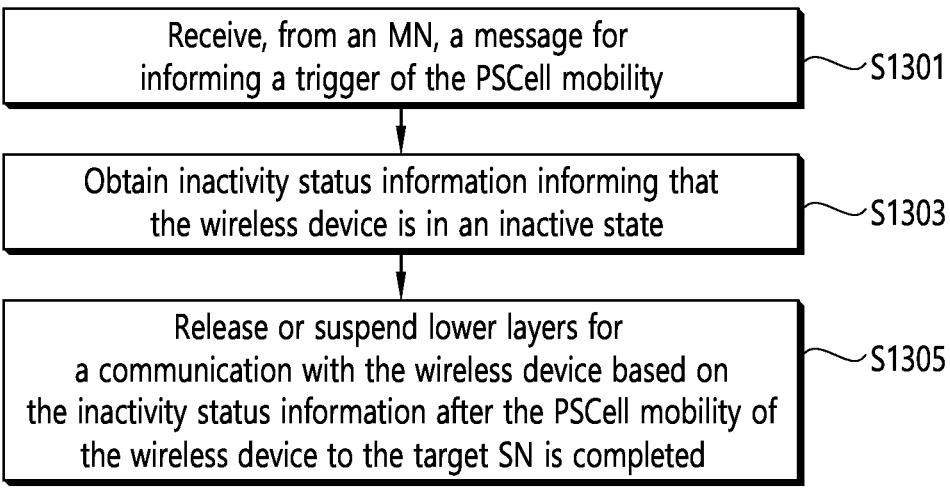

Receive, from an MN, a message for
informing a trigger of the PSCell mobility ~S1301

Obtain inactivity status information informing that
the wireless device is in an inactive state ~S1303

Release or suspend lower layers for
a communication with the wireless device based on
the inactivity status information after the PSCell mobility of
the wireless device to the target SN is completed ~S1305

FIG. 14

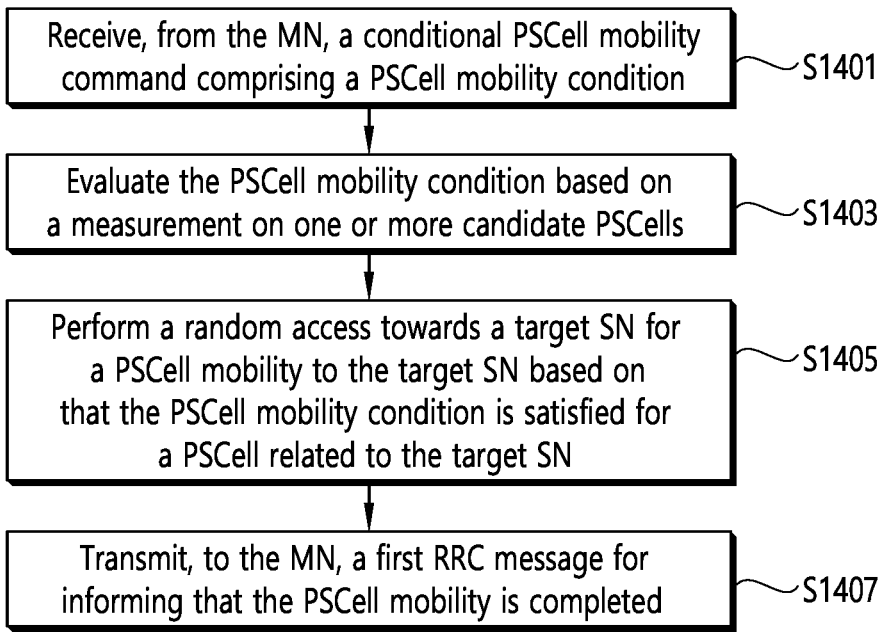

Receive, from the MN, a conditional PSCell mobility command comprising a PSCell mobility condition    ~S1401

Evaluate the PSCell mobility condition based on a measurement on one or more candidate PSCells    ~S1403

Perform a random access towards a target SN for a PSCell mobility to the target SN based on that the PSCell mobility condition is satisfied for a PSCell related to the target SN    ~S1405

Transmit, to the MN, a first RRC message for informing that the PSCell mobility is completed    ~S1407

FIG. 15A

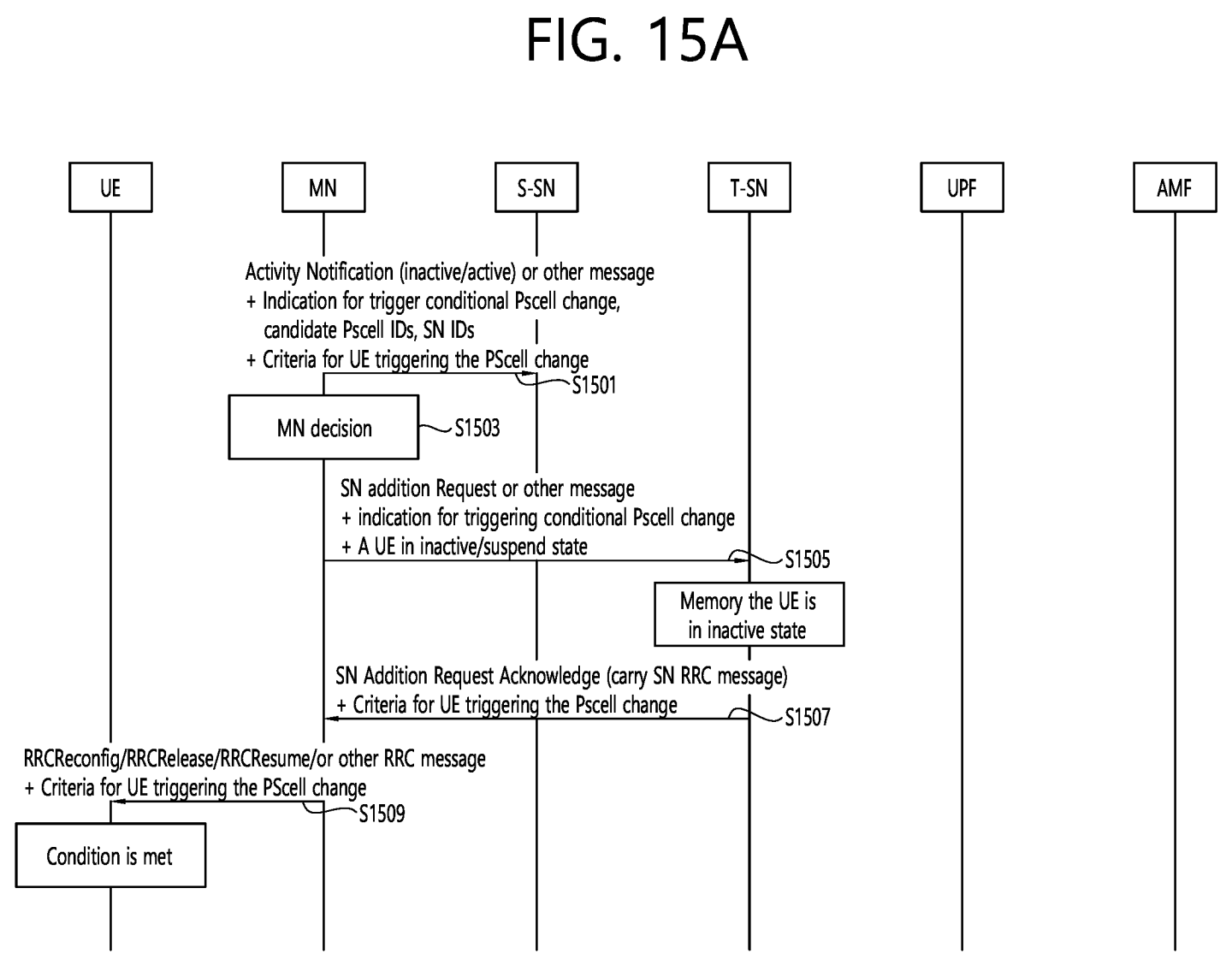

AMF

UPF

T-SN

S-SN

MN

UE

Activity Notification (inactive/active) or other message
+ Indication for trigger conditional Pscell change,
candidate Pscell IDs, SN IDs
+ Criteria for UE triggering the PScell change
S1501

MN decision
S1503

SN addition Request or other message
+ indication for triggering conditional Pscell change
+ A UE in inactive/suspend state Memory the UE is
in inactive state
S1505

SN Addition Request Acknowledge (carry SN RRC message)
+ Criteria for UE triggering the Pscell change
S1507

RRCReconfig/RRCRelease/RRCResume/or other RRC message
+ Criteria for UE triggering the PScell change
S1509

Condition is met

METHOD AND APPARATUS FOR HANDLING MOBILITY IN DUAL CONNECTIVITY IN WIRELESS COMMUNICATION SYSTEM

This application is the National Stage filing under 35 U.S.C. 371 of International Application No. PCT/KR2021/001635 filed on Feb. 8, 2021, which claims priority to Korean Patent Application No. 10-2020-0015129 filed on Feb. 7, 2020, the contents of which are all hereby incorporated by reference herein in their entirety.

TECHNICAL FIELD

The present disclosure relates to handling mobility in dual connectivity in wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a UE may be served by a master node (MN) and a secondary node (SN) in a dual connectivity (DC). In this situation, a signal quality for the SN may degrade, and a change of the SN may be needed—that is, a primary secondary cell (PSCell) mobility may be performed. The PSCell mobility may also be performed while the UE is in inactive mode.

SUMMARY

1. Technical Problem

An aspect of the present disclosure is to provide method and apparatus for handling mobility in DC in a wireless communication system.

An aspect of the present disclosure is to provide method and apparatus for handling a conditional PSCell change in DC in a wireless communication system.

An aspect of the present disclosure is to provide method and apparatus for handling a conditional PSCell change while UE is in inactive state in a wireless communication system.

2. Technical Solution

According to various embodiments, a method performed by a target secondary node (SN) for a primary secondary cell (PSCell) mobility of a wireless device from a source SN in a wireless communication system comprises: receiving, from a master node (MN), a message for informing a trigger of the PSCell mobility; obtaining inactivity status information informing that the wireless device is in an inactive state; and releasing or suspending lower layers for a communication with the wireless device based on the inactivity status information after the PSCell mobility of the wireless device to the target SN is completed, wherein the lower layers comprises at least one of a physical (PHY) layer, a media access control (MAC) layer, or a radio link control (RLC) layer.

According to various embodiments, a method performed by a wireless device served by a master node (MN) and a source secondary node (SN) in a dual connectivity (DC) in a wireless communication system comprises: receiving, from the MN, a conditional PSCell mobility command comprising a PSCell mobility condition; evaluating the PSCell mobility condition based on a measurement on one or more candidate PSCells; performing a random access towards a target SN for a PSCell mobility to the target SN based on that the PSCell mobility condition is satisfied for a PSCell related to the target SN; and transmitting, to the MN, a first radio resource control (RRC) message for informing that the PSCell mobility is completed, wherein lower layers for a communication with the wireless device are released or suspended by the target SN based on inactivity status information, wherein the inactivity status information informs that the wireless device is in an inactive state, and wherein the lower layers comprise at least one of a physical (PHY) layer, a media access control (MAC) layer, or a radio link control (RLC) layer.

According to various embodiments, a target secondary node (SN) for a primary secondary cell (PSCell) mobility of a wireless device from a source SN in a wireless communication system comprises: a transceiver; a memory; and at least one processor operatively coupled to the transceiver and the memory, and configured to: control the transceiver to receive, from a master node (MN), a message for informing a trigger of the PSCell mobility; obtain inactivity status information informing that the wireless device is in an inactive state; and release or suspending lower layers for a communication with the wireless device based on the inactivity status information after the PSCell mobility of the wireless device to the target SN is completed, wherein the lower layer comprises at least one of a physical (PHY) layer, a media access control (MAC) layer, or a radio link control (RLC) layer.

According to various embodiments, a wireless device served by a master node (MN) and a source secondary node (SN) in a dual connectivity (DC) in a wireless communication system comprises: a transceiver; a memory; and at least one processor operatively coupled to the transceiver and the memory, and configured to: control the transceiver to receive, from the MN, a conditional PSCell mobility command comprising a PSCell mobility condition; evaluate the PSCell mobility condition based on a measurement on one or more candidate PSCells; perform a random access towards a target SN for a PSCell mobility to the target SN based on that the PSCell mobility condition is satisfied for a PSCell related to the target SN; and control the transceiver to transmit, to the MN, a first radio resource control (RRC) message for informing that the PSCell mobility is completed, wherein lower layers for a communication with the wireless device is released or suspended by the target SN based on inactivity status information, wherein the inactivity status information informs that the wireless device is in an inactive state, and wherein the lower layer comprises at least one of a physical (PHY) layer, a media access control (MAC) layer, or a radio link control (RLC) layer.

3. Advantageous Effect

The present disclosure may have various advantageous effects.

For example, allowing the PSCell change for an inactive state UE can make a good cell be ready for an inactive UE in advance. When the data packets arrive for a transmission, a cell with good quality can make the service better. UE's service experience can be enhanced. The solution can also avoid the sudden cell change when packets should be transmitted.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 9 shows an example of a dual connectivity (DC) architecture to which technical features of the present disclosure can be applied.

FIG. 13 shows an example of a method for handling UE in inactive state in a PSCell change scenario according to an embodiment of the present disclosure.

FIG. 14 shows an example of a signal flow for handling UE in inactive state in a PSCell change scenario according to an embodiment of the present disclosure.

FIGS. 15A and 15B show a first example of a procedure for conditional PSCell change according to an embodiment of the present disclosure.

FIGS. 16A and 16B show a second example of a procedure for conditional PSCell change according to an embodiment of the present disclosure.

DETAILED DESCRIPTION

Figure 4:
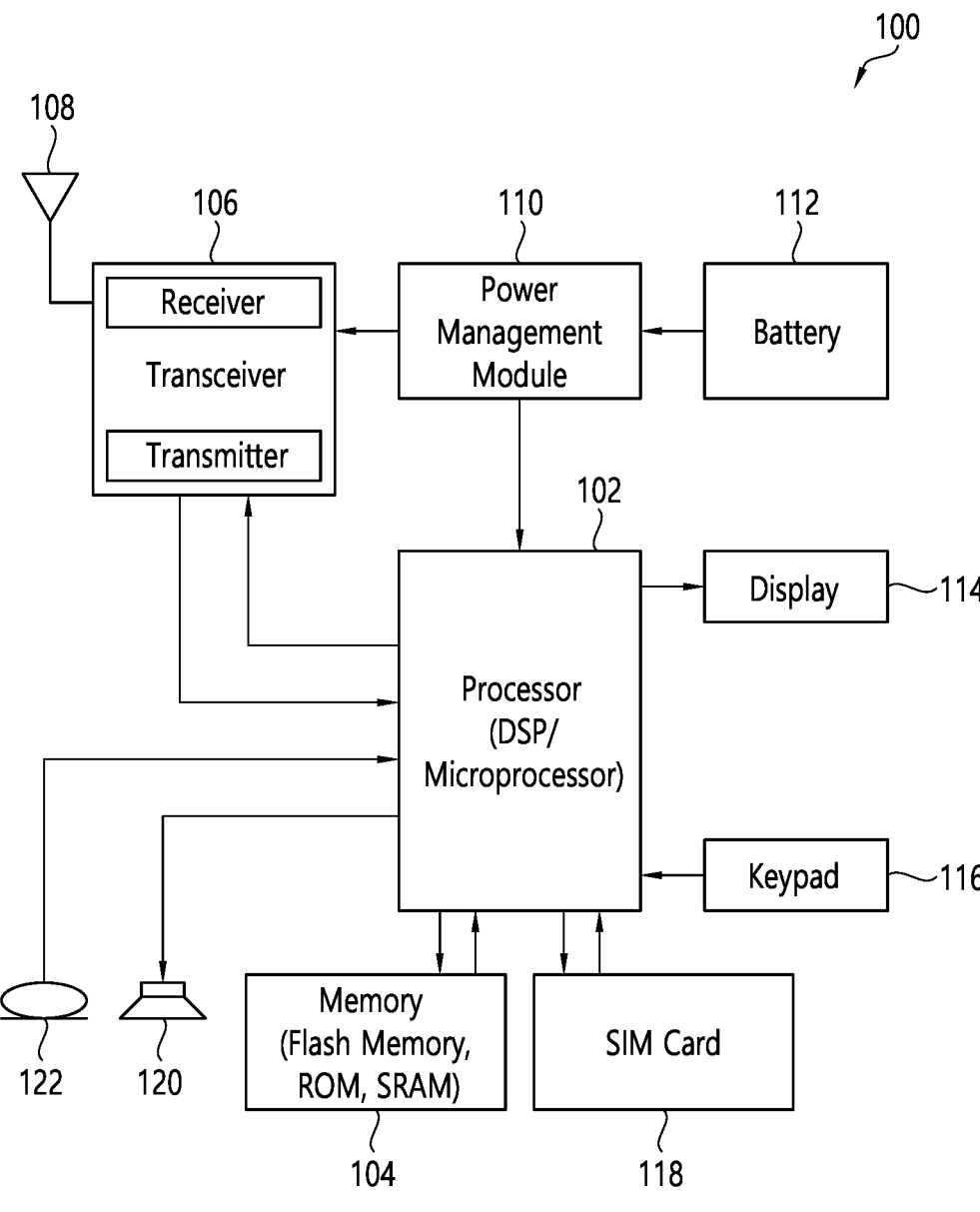
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further, RRC reconfiguration and RRC connection reconfiguration may be used interchangeably.

'SN mobility' refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of event A3 condition (i.e., mobility condition for event A3) or event A5 condition (i.e., mobility condition for event A5). The event A3 condition may comprise at least one of an offset value, or a time-to-trigger (TTT). The event A5 condition may comprise at least one of a serving cell threshold, a target cell threshold, or a TTT. The mobility condition for an event may be satisfied if/when an entering condition (or, also referred to as entry condition) for the event is satisfied for at least the TTT. For example, the entering condition for event A3 may be satisfied if a signal quality for a target cell is better than that for a serving cell more than or equal to the offset value. For another example, an entering condition for event A5 may be satisfied if a signal quality for a target cell is better than the target cell threshold and a signal quality for a serving cell is lower than the serving cell threshold. The mobility condition may also be referred to as an execution condition/conditional execution condition/conditional mobility execution condition (e.g., CHO execution condition).

'SN mobility condition for a target cell' refers to a triggering condition for an SN mobility (i.e., SN addition or SN change) to the target cell. That is, the SN mobility condition for a target cell refers to a condition that should be satisfied for triggering an SN mobility to the target cell. SN mobility condition for a target cell may be classified as:

i) SN addition condition for a target cell, which refers to a triggering condition for an SN addition of the target cell; or ii) SN change condition for a target cell, which refers to a triggering condition for an SN change to the target cell.

SN mobility condition may comprise at least one of an event, time-to-trigger (TTT), offset value, or threshold value(s). The SN mobility condition for an event may be satisfied if an entering condition for the event is satisfied for at least the TTT.

For example, SN addition condition may be related to event A4 or event B1. The entering condition for event A4 or B1 may be satisfied if a signal quality for a target cell is better than a threshold.

For example, SN change condition may be related to event A3 or event A5. The entering condition for event A3 may be satisfied if a signal quality for a target cell is better than that for a source PScell more than or equal to the offset value. For another example, the entering condition for event A5 may be satisfied if a signal quality for a target cell is better than a first threshold and a signal quality for a source PScell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying a target cell configuration for the target cell in the conditional mobility command of the target cell which satisfies a mobility condition for the target cell among the plurality of candidate target cells. The target cell configuration for the target cell may comprise RRC reconfiguration parameters associated with the conditional mobility to the target cell.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
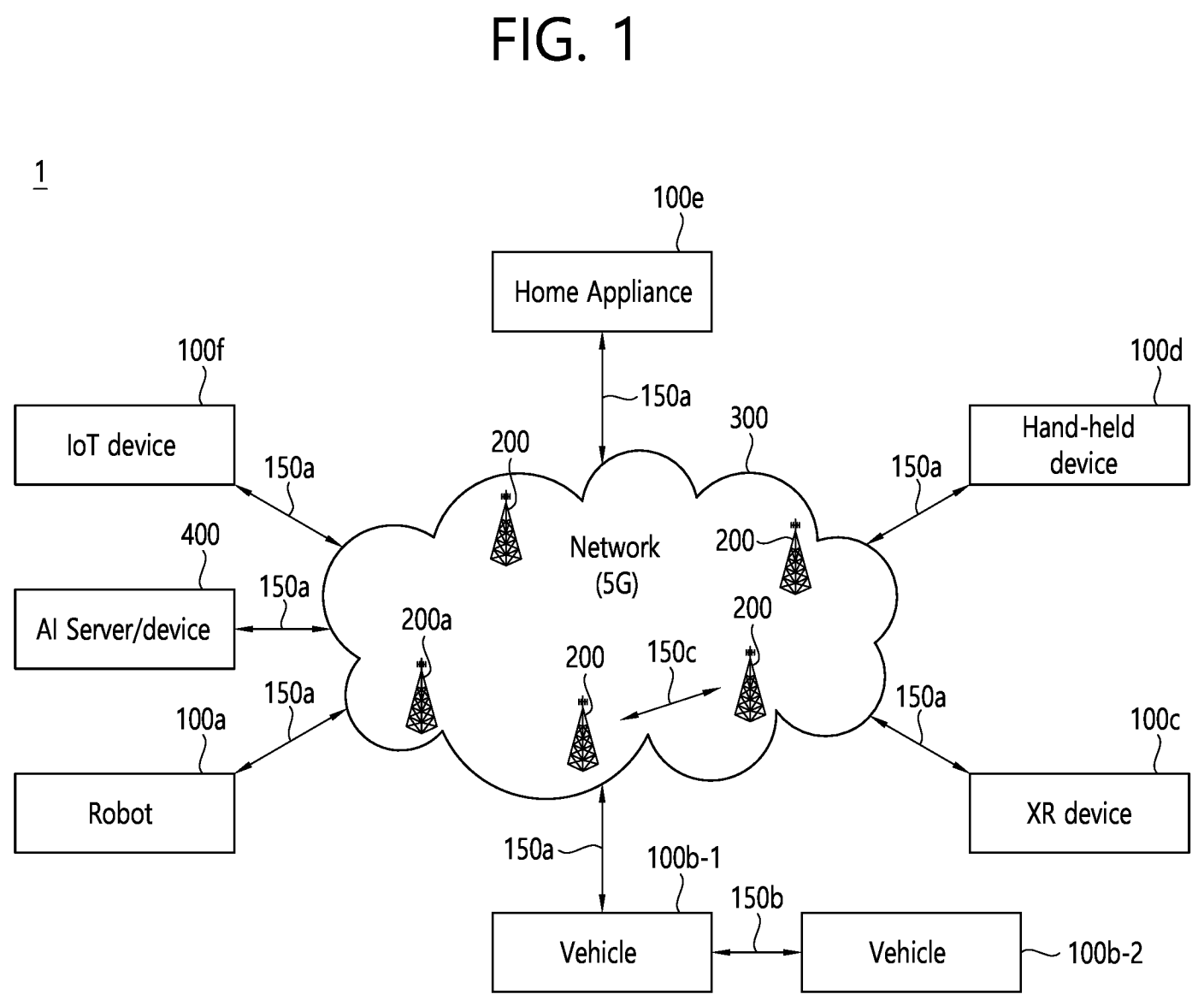

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
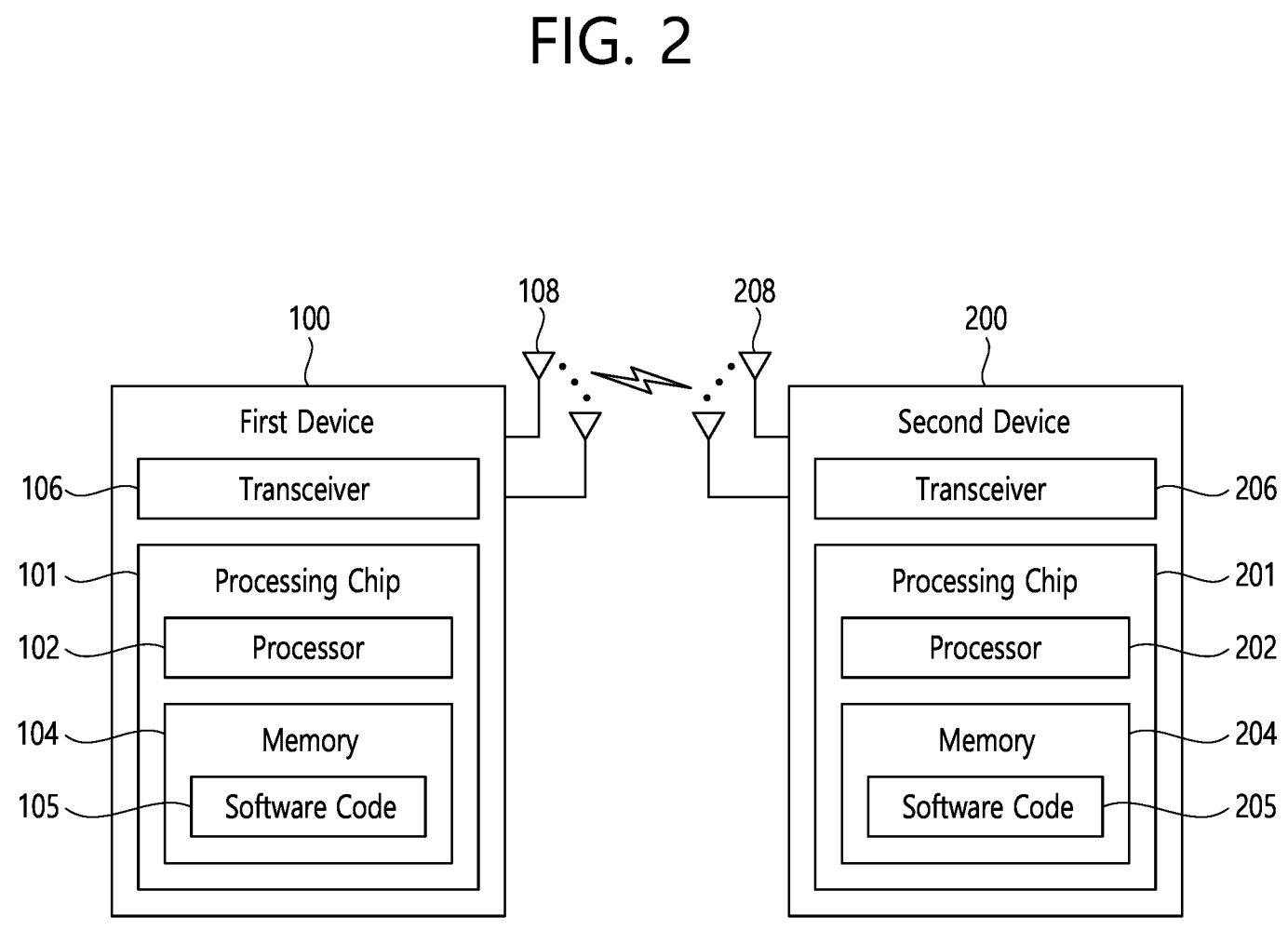

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
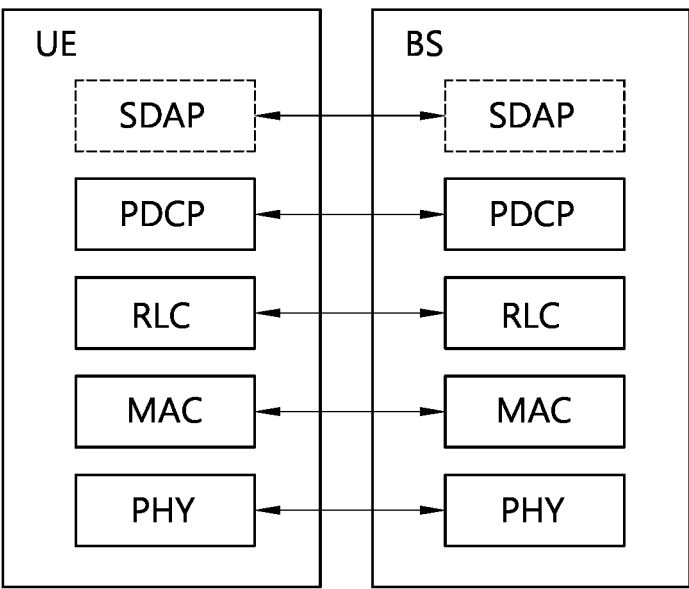
FIG. 5 illustrates an example of a radio interface user plane protocol stack between a UE and a BS.
Figure 6:
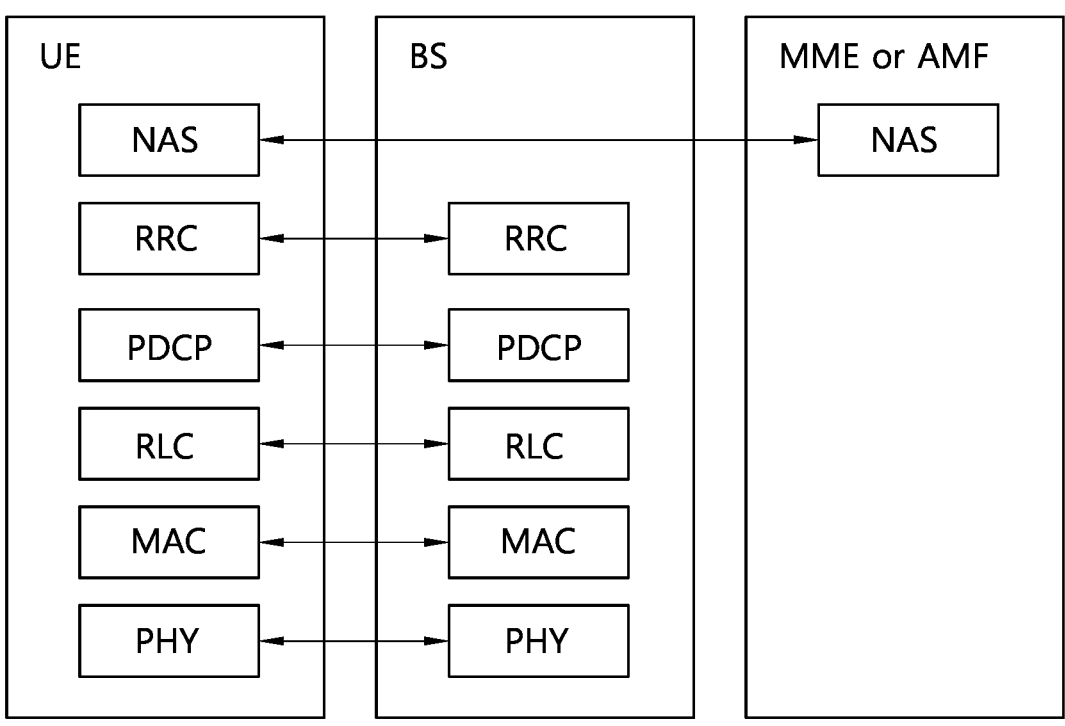
FIG. 6 illustrates an example of a radio interface control plane protocol stack between a UE and a BS.

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
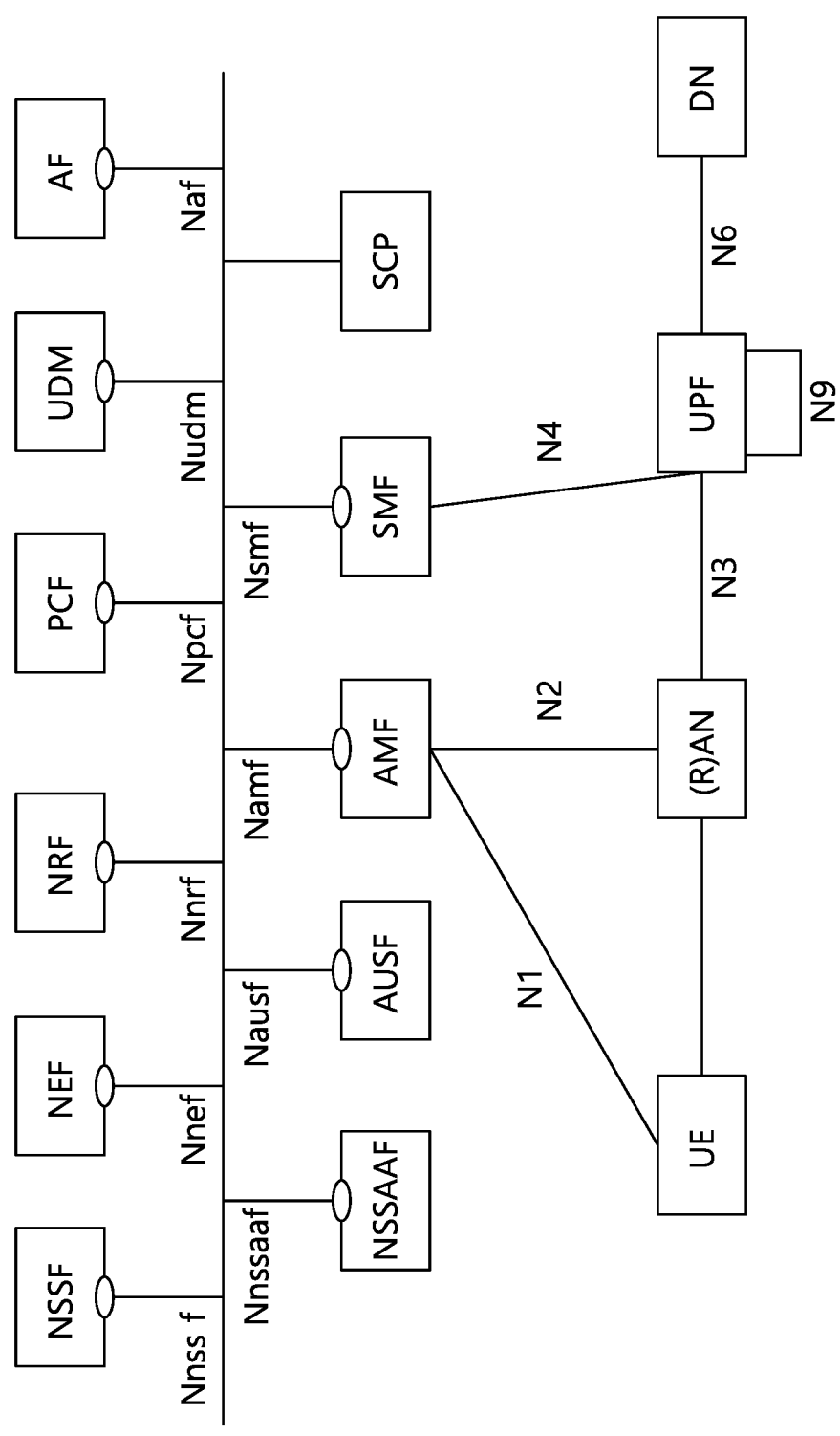
FIG. 7 shows an example of a system architecture for a communication system to which technical features of the present disclosure can be applied.

FIG. 7 shows an example of a system architecture for a communication system to which technical features of the present disclosure can be applied. An example of the communication system may comprise a 5G system and/or NR system.

Referring to FIG. 7, the communication system may comprise various core network entities, such as an access and mobility management function (AMF), a session management function (SMF), a user plane function (UPF), a policy control function (PCF), an authentication server function (AUSF), a unified data management (UDM), an application function (AF), a network exposure function (NEF), a network function repository function (NRF), a network slice selection function (NSSF), a network slice specific authentication and authorization function (NS-SAAF) and a service communication proxy (SCP).

The AMF may support a termination of non-access stratum (NAS) signalling, NAS ciphering & integrity protection, registration management, connection management, mobility management, access authentication and authorization, security context management. The AMF may be associated with N1, N2 and Namf. The N1 is a reference point between the UE and the AMF. The N2 is a reference point between the RAN and the AMF. The Namf is a service-based interface exhibited by the AMF.

The SMF may support a session management (session establishment, modification, release), UE internet protocol (IP) address allocation & management, dynamic host configuration protocol (DHCP) functions, termination of NAS signalling related to session management, DL data notification, traffic steering configuration for UPF for proper traffic routing. The SMF may be associated with N4 and Nsmf. The N4 is a reference point between the SMF and the UPF. The Nsmf is a service-based interface exhibited by the SMF.

The UPF may support packet routing & forwarding, packet inspection, quality of service (QoS) handling, acts as external protocol data unit (PDU) session point of interconnect to Data Network (DN), and may be an anchor point for intra- & inter-radio access technology (RAT) mobility. The UPF may be associated with N3, N4, N6 and N9. The N3 is a reference point between the RAN and the UPF. The N6 is a reference point between the UPF and the DN. The N9 is a reference point between two UPFs.

The PCF may support unified policy framework, providing policy rules to control plane (CP) functions, access subscription information for policy decisions in a unified data repository (UDR). The PCF may be associated with Npcf. The Npcf is a service-based interface exhibited by the PCF.

The AUSF may act as an authentication server. The AUSF may be associated with Nausf. The Nausf is a service-based interface exhibited by the AUSF.

The UDM may support generation of Authentication and Key Agreement (AKA) credentials, user identification handling, access authorization, subscription management. The UDM may be associated with Nudm. The Nudm is a service-based interface exhibited by the UDM.

The AF may support application influence on traffic routing, accessing NEF, interaction with policy framework for policy control. The AF may be associated with Naf. The Naf is a service-based interface exhibited by the AF.

The NEF may support exposure of capabilities and events, secure provision of information from external application to 3GPP network, translation of internal/external information. The NEF may be associated with Nnef. The Nnef is a service-based interface exhibited by the NEF.

The NRF may support service discovery function, maintains NF profile and available NF instances. The NRF may be associated with Nnrf. The Nnrf is a service-based interface exhibited by the NRF.

The NSSF may support selecting of the Network Slice instances to serve the UE, determining the allowed network slice selection assistance information (NSSAI), determining the AMF set to be used to serve the UE. The NSSF may be associated with Nnssf. The Nnssf is a service-based interface exhibited by the NSSF.

The NSSAAF may support Network Slice-Specific Authentication and Authorization with a AAA Server (AAA-S). If the AAA-S belongs to a third party, the NSSAAF may contact the AAA-S via an a AAA proxy (AAA-P). The NSSAAF may be associated with Nnssaaf. The Nnssaaf is a service-based interface exhibited by the NSSAAF.

The SCP may support indirect communication, delegated discovery, message forwarding and routing to destination network function (NF)/NF service, Message forwarding and routing to a next hop SCP, communication security (e.g. authorization of the NF Service Consumer to access the NF Service Producer API), load balancing, monitoring, overload control, optionally interact with UDR, to resolve the UDM Group ID/UDR Group ID/AUSF Group ID/PCF Group ID/charging function (CHF) Group ID/home subscriber server (HSS) Group ID based on UE identity (e.g., subscription permanent identifier (SUPI) or international mobility subscriber identity (IMPI)/IP multimedia public identity (IMPU)).

Figure 8:
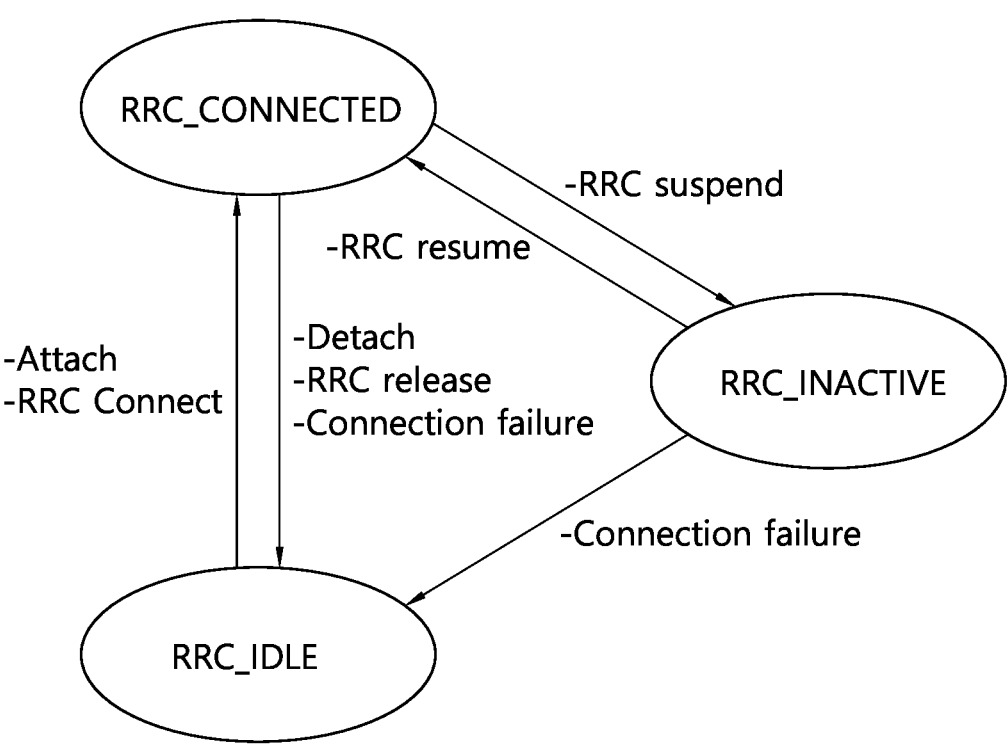
FIG. 8 shows an example of possible RRC states in a wireless communication system to which technical features of the present disclosure can be applied.

FIG. 8 shows an example of possible RRC states in a wireless communication system to which technical features of the present disclosure can be applied.

Referring to FIG. 8, there may be 3 possible RRC states in a wireless communication system (i.e., RRC_IDLE, RRC_CONNECTED and/or RRC_IDLE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell—radio network temporary identifier (C-RNTI) for signallings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INCATIVE may be construed as a mix of the idle state and the connected state.

As illustrated in FIG. 8, the UE may transit to RRC_CONNECTED from RRC_IDLE by performing initial attach procedure or RRC connection establishment procedure. The UE may transit to RRC_IDLE from RRC_CONNECTED when detach, RRC connection release and/or connection failure (e.g., radio link failure (RLF)) has occurred. The UE may transit to RRC_INACTIVE from RRC_INACTIVE when RRC connection is suspended, and transit to RRC_CONNECTED from RRC_INACTIVE when RRC connection is resume. The UE may transit to RRC_IDLE from RRC_INACTIVE when connection failure such as RLF has occurred.

Figure 9:
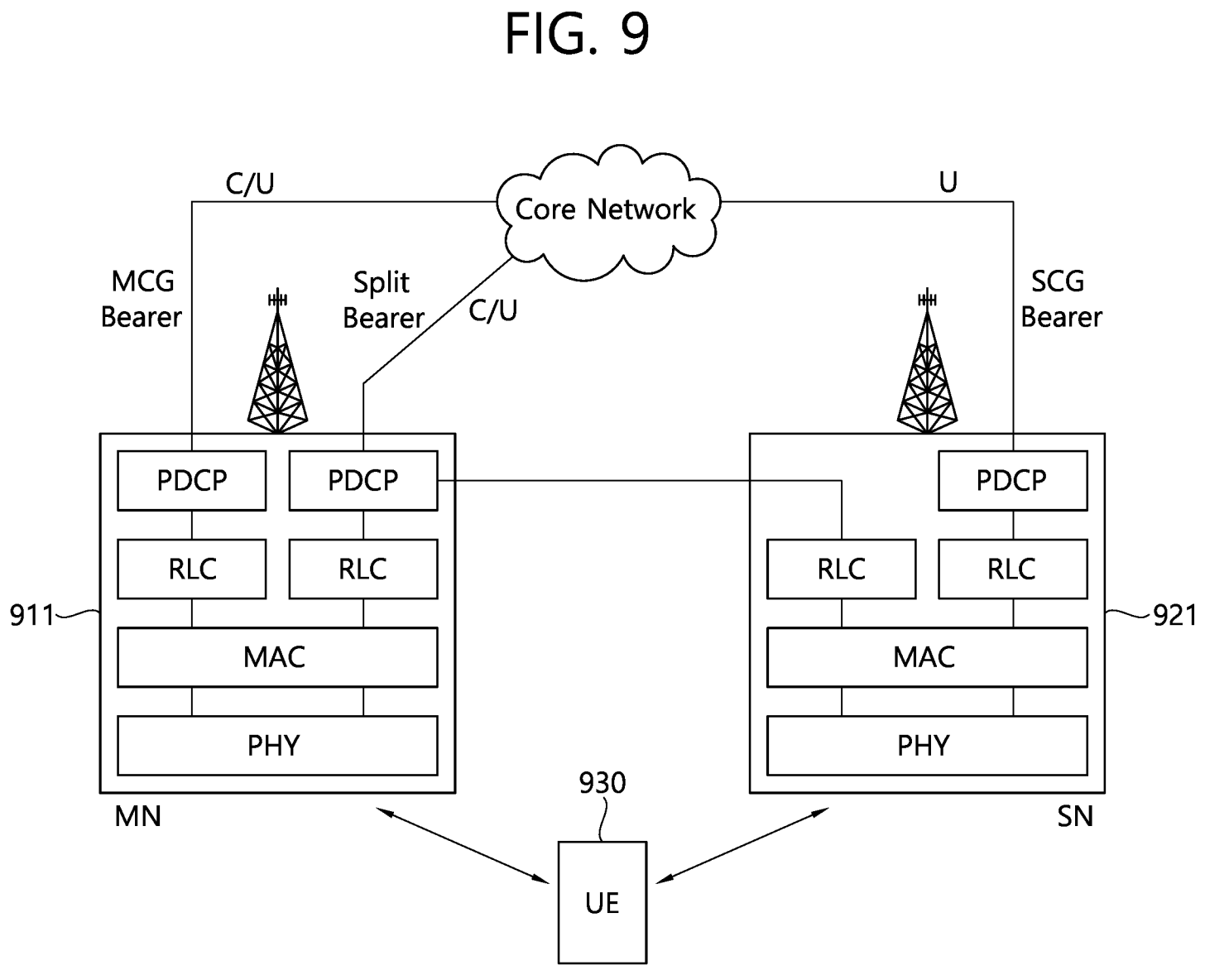

FIG. 9 shows an example of a dual connectivity (DC) architecture to which technical features of the present disclosure can be applied.

Referring to FIG. 9, MN 911, SN 921, and a UE 930 communicating with both the MN 911 and the SN 921 are illustrated. As illustrated in FIG. 9, DC refers to a scheme in which a UE (e.g., UE 930) utilizes radio resources provided by at least two RAN nodes comprising a MN (e.g., MN 911) and one or more SNs (e.g., SN 921). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 911) refers to a main RAN node providing services to a UE in DC situation. SN (e.g., SN 921) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 9, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 9, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 9, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 9, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 10:
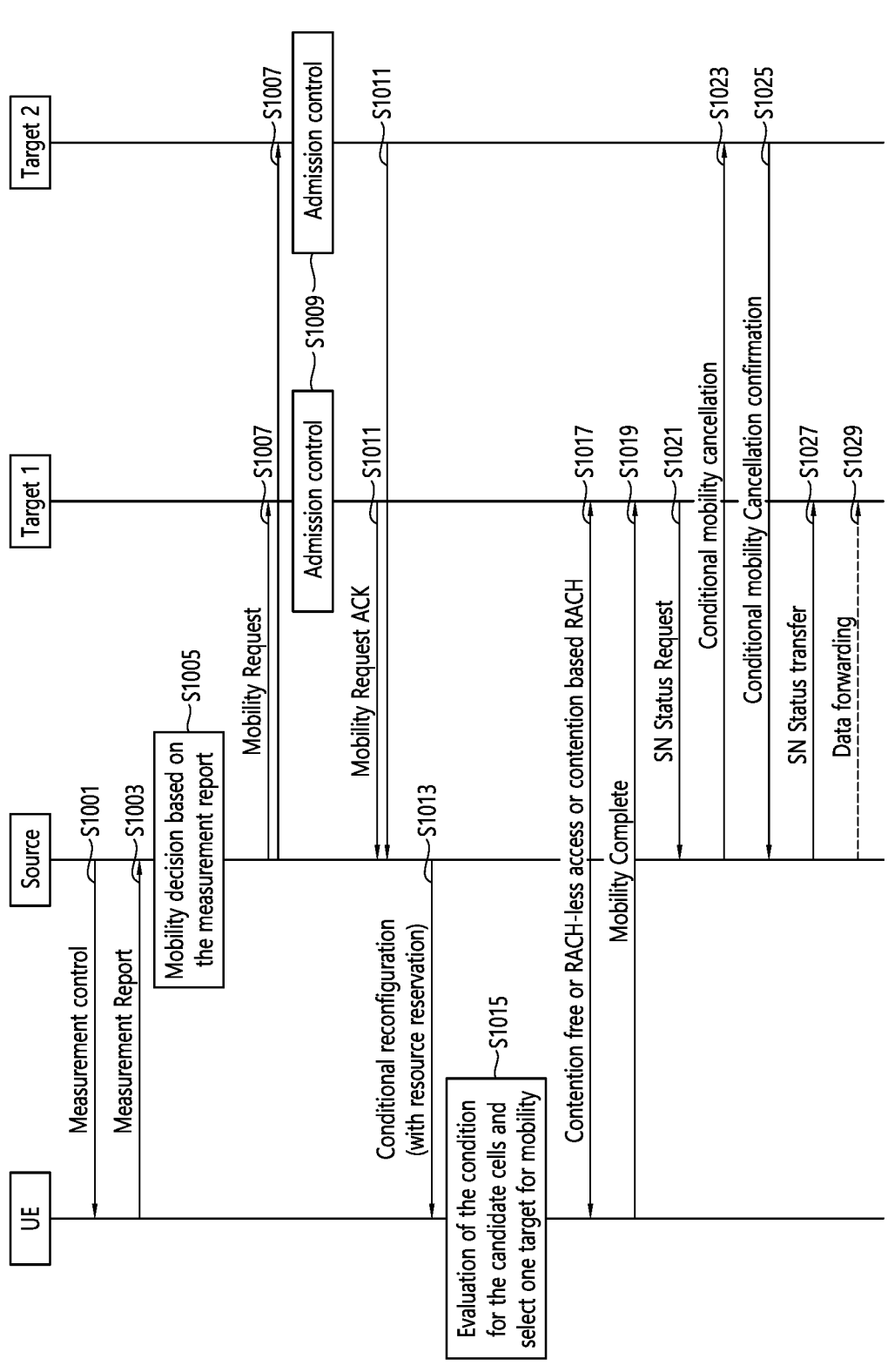
FIG. 10 shows an example of a conditional mobility procedure to which technical features of the present disclosure can be applied.

FIG. 10 shows an example of a conditional mobility procedure to which technical features of the present disclosure can be applied. The steps illustrated in FIG. 10 can also be applied to a conditional handover procedure, conditional SN addition procedure and/or conditional SN change procedure.

Referring to FIG. 10, in step S1001, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1003, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source cell may make a mobility decision based on the measurement report. For example, the source cell may make a mobility decision and determine candidate target cells (e.g., target cell 1 and target cell 2) for mobility among neighbor cells around the UE based on a result of measurement (e.g., signal quality, reference signal received power (RSRP), reference signal received quality (RSRP)) on the neighbor cells.

In step S1007, the source cell may transmit mobility request messages to the target cell 1 and the target cell 2 which are determined in step S1005. That is, the source cell may perform mobility preparation with the target cell 1 and the target cell 2. The mobility request message may comprise necessary information to prepare the mobility at the target side (e.g., target cell 1 and target cell 2).

In step S1009, each of the target cell 1 and the target cell 2 may perform an admission control based on information included in the mobility request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1011, the target cell and the target cell 2 may transmit a mobility request acknowledge (ACK) message to the source cell. The mobility request ACK message may comprise information on resources reserved and prepared for a mobility. For example, the mobility request ACK message may comprise a transparent container to be sent to the UE as an RRC message to perform the mobility. The container may include a new C-RNTI, target gNB security algorithm identifiers for the selected security algorithms, a dedicated RACH preamble, and/or possibly some other parameters i.e. access parameters, SIBs. If RACH-less mobility is configured, the container may include timing adjustment indication and optionally a preallocated uplink grant. The mobility request ACK message may also include RNL/TNL information for forwarding tunnels, if necessary. As soon as the source cell receives the mobility request ACK message, or as soon as the transmission of the conditional mobility command is initiated in the downlink, data forwarding may be initiated.

In step S1013, the source cell may transmit a conditional reconfiguration to the UE. The conditional reconfiguration may be also referred to as (or, may comprise) conditional handover (CHO) configuration and/or a conditional mobility command (e.g., CHO command). The conditional reconfiguration may comprise a conditional reconfiguration for each of the candidate target cells (e.g., target cell 1, target cell 2). For example, the conditional reconfiguration may comprise a conditional reconfiguration for the target cell 1, and a conditional reconfiguration for the target cell 2. The conditional reconfiguration for the target cell 1 may comprise a mobility condition for the target cell 1, and a target cell configuration for the target cell 1. The target cell configuration for the target cell 1 may comprise RRC reconfiguration parameters associated with a mobility to the target cell 1, including information on resources reserved for the mobility to the target cell 1. Similarly, the conditional reconfiguration for the target cell 2 may comprise a mobility condition for the target cell 2, and a target cell configuration for the target cell 2. The target cell configuration for the target cell 2 may comprise RRC reconfiguration parameters associated with a mobility to the target cell 2, including information on resources reserved for the mobility to the target cell 2.

The mobility condition may inform at least one measurement ID. For example, the mobility condition may inform at most 2 measurement IDs. If a mobility condition of a target cell informs a measurement ID which is related to a measurement object A and a report configuration B, evaluating the mobility condition may comprise determining whether a measurement result on the measurement object A satisfies a report condition in the report configuration B. If the measurement result on the measurement object A satisfies the report condition in the report configuration B according to the evaluation of the mobility condition, the UE may determine that the mobility condition of the target cell is satisfied (or, the target cell/measurement result for the target cell satisfies the mobility condition of the target cell), and perform a mobility to the target cell.

In step S1015, the UE may perform an evaluation of the mobility condition for the candidate target cells (e.g., target cell 1, target cell 2) and select a target cell for a mobility among the candidate target cells. For example, the UE may perform measurements on the candidate target cells, and determine whether a candidate target cell satisfies a mobility condition for the candidate target cell among the candidate target cells based on a result of the measurements on the candidate target cells. If the UE identifies that the target cell 1 satisfies a mobility condition for the target cell 1, the UE may select the target cell 1 as a target cell for the mobility.

In step S1017, the UE may perform a random access to the selected target cell (e.g., target cell 1). For example, the UE may transmit a random access preamble to the target cell 1, and receive a random access response comprising an uplink grant from the target cell 1. If RACH-less mobility is configured, the step S1017 may be omitted, and the uplink grant may be provided in step S1013.

In step S1019, the UE may transmit a mobility complete message to the target cell 1. When the UE has successfully accessed the target cell 1 (or, received uplink grant when RACH-less mobility is configured), the UE may transmit a mobility complete message comprising a C-RNTI to confirm the mobility, along with uplink buffer status report, whenever possible, to the target cell 1 to indicate that the mobility procedure is completed for the UE. The target cell 1 may verify the C-RNTI transmitted in the mobility complete message.

In step S1021, the target cell 1 may transmit a sequence number (SN) status request message to the source cell. The target cell 1 may request the source cell to inform the target cell 1 of a SN of a packet the target cell 1 has to transmit after the mobility, via the SN status request message.

In step S1023, the source cell may transmit a conditional mobility cancellation message to the target cell 2 which is not selected as a target cell for a mobility among the candidate target cells. After receiving the conditional mobility cancellation message, the target cell 2 may release resources that are reserved in case of a mobility.

In step S1025, the target cell 2 may transmit a conditional mobility cancellation confirmation message to the source cell, as a response for the conditional mobility cancellation message. The conditional mobility cancellation confirmation message may inform that the target cell 2 has released resources reserved in case of a mobility.

In step S1027, the source cell may transmit a SN status transfer message to the target cell 1, as a response for the SN status request message. The SN status transfer message may inform the target cell 1 of a SN of a packet the target cell 1 has to transmit after the mobility.

In step S1029, the source cell may perform a data forwarding to the target cell 1. For example, the source cell may forward data received from a core network to the target cell 1 so that the target cell 1 can now transmit the data to the UE.

Hereinafter, activity notification is described.

For EN-DC, the activity notification function may be used to report user plane activity within SN resources. The activity notification function may be used to either report inactivity or resumption of activity after inactivity was reported. In EN-DC, the activity reporting may be provided from the SN only. The MN may take further actions.

Support of activity notification in EN-DC may be used to keep the MN informed about user traffic activity in resources owned by the SN. The MN may take appropriate action upon receiving such notification.

For example, the SN may transmit an activity notification message informing a user data inactivity of resources owned by the SN to the MN. After/upon receiving the activity notification message, the MN may decide to keep SN resources. After a while, the SN may transmit an activity notification message informing a resumption of user plane activity.

For MR-DC with 5GC, the activity notification function may be used to report user plane activity within SN resources or to report a RAN paging failure event to the SN. The activity notification function may be used to either report inactivity or resumption of activity after inactivity was reported. In MR-DC with 5GC, the activity reporting may be provided from the SN only. The MN may take further actions. RAN paging failure reporting may be provided from the MN only.

For example, the SN may transmit the activity notification message informing a user data inactivity. After/upon receiving the activity notification message, the MN may decide further actions that impact SN resources (e.g., send UE to RRC_INACTIVE, bearer reconfiguration). For example, MN may take no action. After a while, the SN may transmit an activity notification message informing a resumption of user plane activity to the MN, notifying the MN that the (UE or PDU Session or QoS flow) is no longer inactive.

According to various embodiments of the present disclosure, the activity notification message (or, activity notification) may be transmitted from the SN to the MN. The activity notification message may indicate an activity status for SN resources (i.e., resources owned by the SN) and/or SN terminated bearers.

The activity status may comprise:
user plane/data/traffic inactivity (i.e., inactivity status information); or
a resumption/reactivation of user plane/data/traffic activity (i.e., activity status information).

Figure 11A:
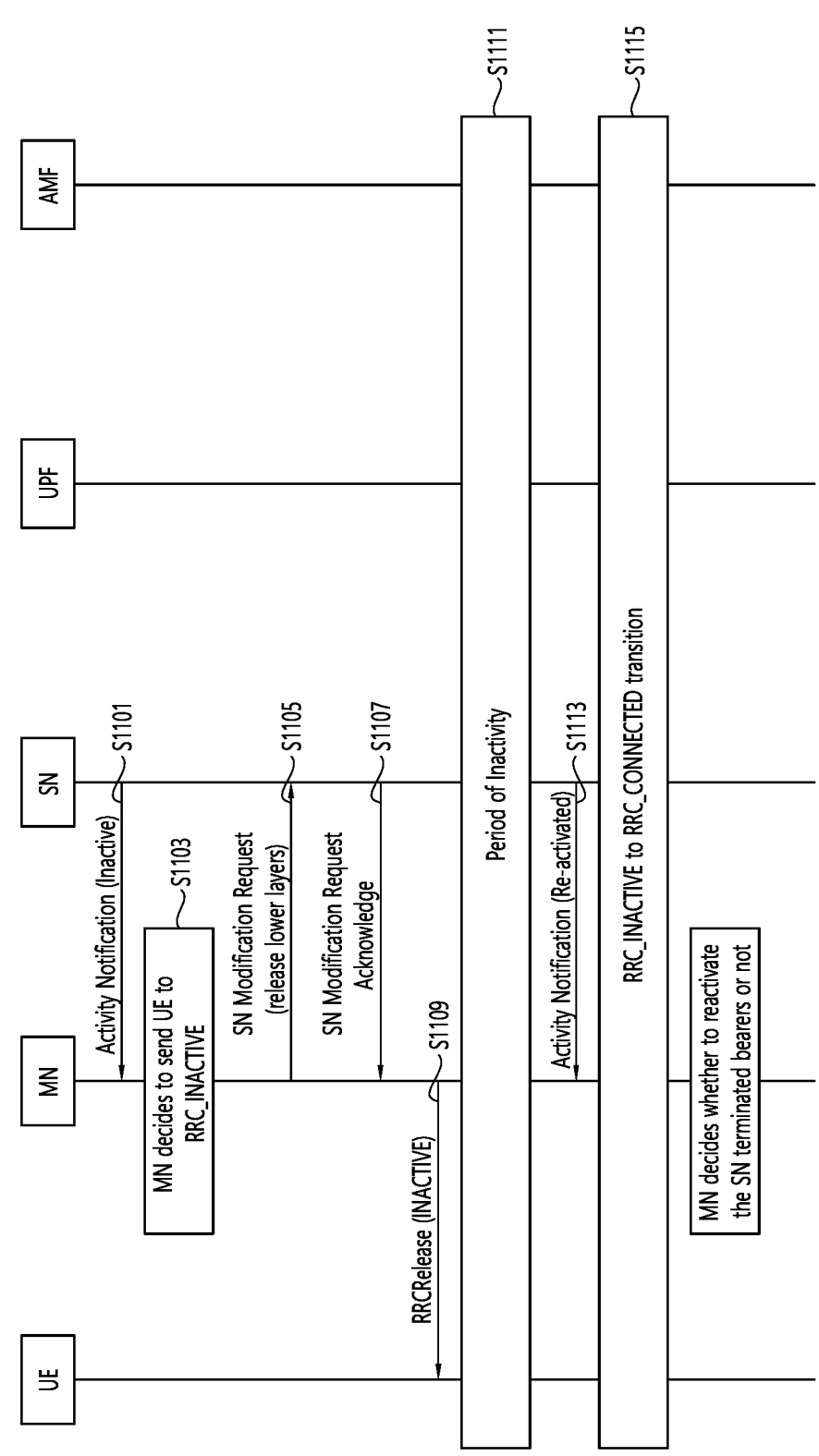
FIGS. 11A and 11B show a first example of MR-DC with 5GC with RRC_INACTIVE to which technical features of the present disclosure can be applied.
Figure 11B:
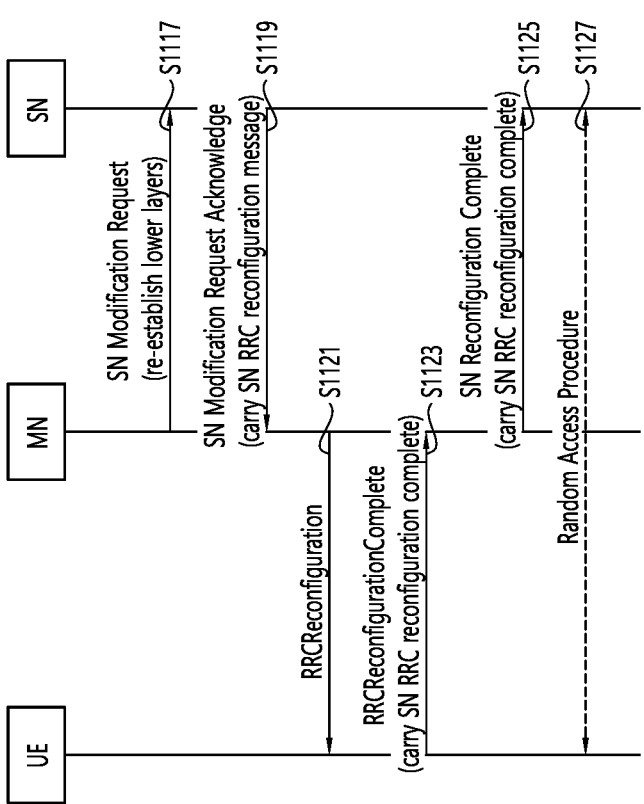

FIGS. 11A and 11B show a first example of MR-DC with 5GC with RRC_INACTIVE to which technical features of the present disclosure can be applied.

The activity notification function may be used to enable MR-DC with 5GC with RRC_INACTIVE operation. The MN node may decide, after inactivity is reported from the SN and also MN resources show no activity, to send the UE to RRC_INACTIVE. Resumption to RRC_CONNECTED may take place after activity is reported from the SN for SN terminated bearers.

FIGS. 11A and 11B shows how activity notification function interacts with NG-RAN functions for RRC_INAC-TIVE and SN modification procedures in order to keep the higher layer MR-DC NG-RAN resources established for UEs in RRC_INACTIVE, including NG and Xn interface C-plane, U-plane and bearer contexts established while lower layer MCG and SCG resources are released. NG-RAN may memorise the cell group configuration for MCG in order to apply delta signalling at resume. After the UE has transited successfully back to RRC_CONNECTED, lower layer SCG resources may be established afterwards by means of RRC connection reconfiguration.

Referring to FIG. 11A, in step S1101, the SN may transmit an activity notification message indicating a user data inactivity for SN terminated bearers to the MN.

In step S1103, the MN may decide to send the UE to RRC_INACTIVE.

In step S1105, the MN may transmit an SN modification request message indicating to release lower layers to the SN. The MN may trigger the MN initiated SN Modification procedure, requesting the SN to release lower layers.

In step S1107, the SN may transmit a SN modification request acknowledge (ACK) message, as a response for the SN modification request message.

In step S1109, the UE may be sent to RRC_INACTIVE.

In step S1111, a period of inactivity may proceed.

In step S1113, after the period of inactivity, the SN may transmit an activity notification a resumption/reactivation of user data activity to the MN.

In step S1115, the UE may return to RRC_CONNECTED.

In an example, the MN may decide whether to reactivate the SN terminated bearers. If (e.g. due to UE mobility), MN decides not to reactivate the SN terminated bearers, the MN may initiate the MN initiated SN release procedure and the procedure may end.

Steps in FIG. 11A may continue to those in FIG. 11B.

Referring to FIG. 11B, in step S1117, the MN may trigger the MN initiated SN modification procedure to re-establish lower layers via SN modification request message.

In step S1119, the SN may transmit an SN modification request ACK message carrying SN RRC reconfiguration message to the MN. The SN may provide configuration data within the SN RRC configuration/reconfiguration message.

In step S1121 to step S1127, the RRC connection reconfiguration procedure commences.

In step S1121, the MN may transmit RRC reconfiguration message to the UE.

In step S1123, the UE may transmit RRC reconfiguration complete message carrying SN RRC reconfiguration complete to the MN.

In step S1125, the MN may transmit the SN reconfiguration complete message carrying SN RRC reconfiguration complete to the SN.

In step S1127, the UE may perform a random access procedure towards the SN.

Figure 12A:
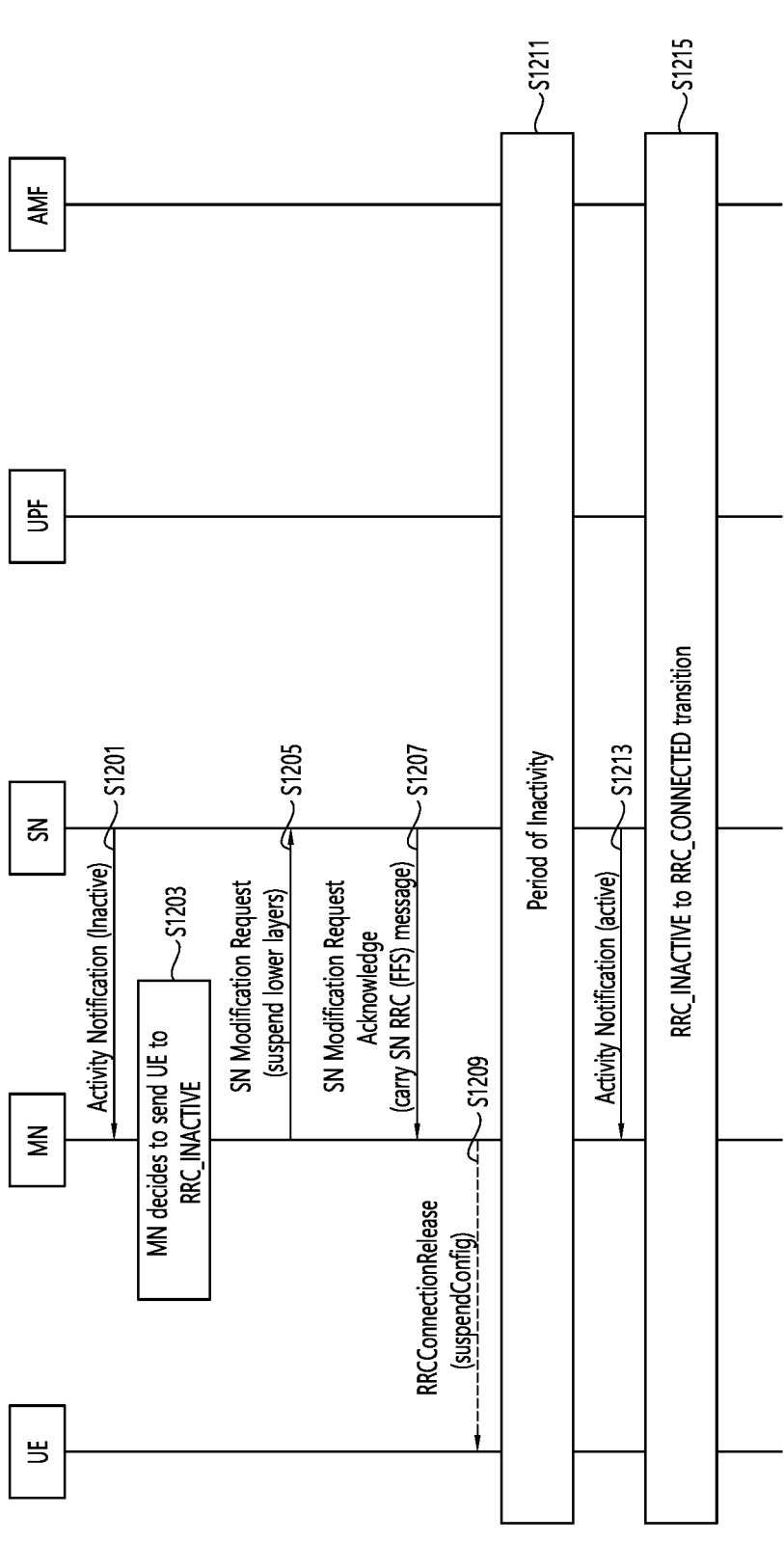
FIGS. 12A and 12B show a first example of MR-DC with 5GC with RRC_INACTIVE to which technical features of the present disclosure can be applied.
Figure 12B:
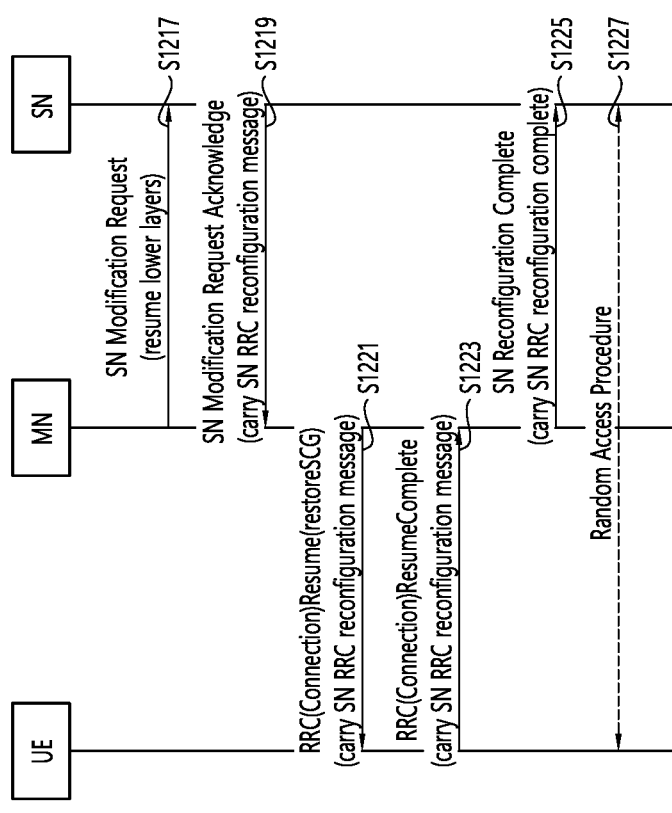

FIGS. 12A and 12B show a first example of MR-DC with 5GC with RRC_INACTIVE to which technical features of the present disclosure can be applied.

The activity notification function may be used to enable MR-DC with 5GC with RRC_INACTIVE operation. The MN node may decide, after inactivity is reported from the SN and also MN resources show no activity, to send the UE to RRC_INACTIVE, while keeping the SCG configuration. Resumption to RRC_CONNECTED may take place after activity is reported from the SN for SN terminated bearers.

FIGS. 12A and 12B show how activity notification function interacts with NG-RAN functions for RRC_INACTIVE and SN modification procedures in order to keep the full MR-DC NG-RAN resources established for UEs in RRC_INACTIVE. When the UE transits successfully back to RRC_CONNECTED, lower layer MCG and SCG configurations may be restored or reconfigured by means of RRC (Connection) resume.

Referring to FIG. 12A, in step S1201, the SN may transmit an activity notification message indicating a user data inactivity for SN terminated bearers to the MN.

In step S1203, the MN may decide to send the UE to RRC_INACTIVE.

In step S1205, the MN may transmit SN modification request message indicating to suspend lower layers to the SN. The MN may trigger the MN initiated SN Modification procedure, requesting the SN to suspend lower layers.

In step S1207, the SN may transmit SN modification request ACK message, as a response for the SN modification request message.

In step S1209, the UE may be sent to RRC_INACTIVE.

In step S1211, a period of inactivity may proceed.

In step S1213, the SN may transmit activity notification indicating a resumption/reactivation of user data activity to the MN.

In step S1215, after a period of inactivity, upon receiving the activity notification from the SN, the MN may decide to return the UE to RRC_CONNECTED.

In an embodiment, the MN may decide whether to reactivate the SN terminated bearers. If (e.g. due to UE mobility), the MN decides not to reactivate the SN terminated bearers, the MN may initiate the MN initiated SN release procedure, rather than the MN initiated SN modification procedure in step S1217 and S1219.

Steps in FIG. 12A may continue to those in FIG. 12B.

Referring to FIG. 12B, in step S1217, the MN may transmit SN modification request message indicating to resume lower layers to the SN. The MN may trigger the MN initiated SN Modification procedure to resume the SCG lower layers.

In step S1219, the SN may transmit a SN modification request ACK message carrying SN RRC reconfiguration message. If the SCG configuration needs to be updated, the SN may provide the configuration data within an SN RRC configuration message.

In step S1221 and S1223, the RRC (Connection) resume procedure may commence, where the UE is instructed to resume both the MCG and the SCG. If the SCG configuration is to be updated, the new configuration may be provided in the RRC(Connection)Resume message.

In step S1225, the MN may inform the SN that the UE has completed the reconfiguration procedure successfully, via the SN Reconfiguration Complete message, including the SN RRC response message, if received from the UE.

In step S1227, If instructed, the UE may perform synchronisation towards the PSCell of the SN.

In 5G NR, the DC/carrier aggregation (CA) enhancements may have become important items for enhancing 5G services. To enhance the reliability for UE's service in the DC's secondary node, the current DC mobility procedure may need to be enhanced.

An example use case may include how to allow the PSCell change for an inactive state UE in various cases, such as i) when SN decides for a UE to go into inactive state, ii) when SN goes to active state for a UE, and/or iii) even when the UE is inactive in SN.

Therefore, various embodiments of the present disclosure may provide solutions to realize the PScell change for an inactive state UE, for example, the PSCell change in the inter-SN case.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 13 shows an example of a method for handling UE in inactive state in a PSCell change scenario according to an embodiment of the present disclosure. Steps illustrated in FIG. 13 may be performed by a target SN for a PSCell mobility of a wireless device from a source SN. The target SN may be a kind of a base station.

Referring to FIG. 13, in step S1301, the target SN may receive, from an MN, a message for informing a trigger of a PSCell mobility.

In step S1303, the target SN may obtain inactivity status information informing that the wireless device is in an inactive state.

In step S1305, the target SN may release or suspend lower layers for a communication with the wireless device based on the inactivity status information, after the PSCell mobility of the wireless device to the target SN is completed. The lower layers may comprise at least one of physical layer, MAC layer or RLC layer.

According to various embodiments, the target SN may receive, from the MN, an SN addition request message comprising the inactivity status information, so that the target SN may obtain the inactivity status information.

According to various embodiments, the SN addition request message may further comprise the message for informing a trigger of the PSCell mobility.

According to various embodiments, the target SN may store the inactivity status information included in the SN addition request message. The target SN may transmit an SN addition request acknowledge (ACK) message as a response for the SN addition request message.

According to various embodiments, the target SN may store the inactivity status information included in the SN addition request message based on the message for informing a trigger of the PSCell mobility.

According to various embodiments, the target SN may transmit, to the MN, information for a PSCell mobility condition. The target SN may perform a random access procedure with the wireless device based on that the PSCell mobility condition is satisfied for a PSCell related to the target SN.

According to various embodiments, the target SN may, after performing the random access procedure, transmit a message informing that the PSCell mobility is completed to the MN.

According to various embodiments, the target SN may, after performing the random access procedure, receive a radio resource control (RRC) message for informing that the PSCell mobility is completed from the MN. The target SN may release or suspend lower layers for a communication with the wireless device based on the inactivity status information upon receiving the RRC message.

According to various embodiments, the RRC message may comprise the inactivity status information. The target SN may identify the inactivity status information in the RRC message, so that the target SN can obtain the inactivity status information.

According to various embodiments, the target SN may, after performing the random access procedure, receive a first radio resource control (RRC) message for informing that the PSCell mobility is completed from the MN. The target SN may receive a second RRC message comprising the inactivity status information. The target SN may identify the inactivity status information in the second RRC message, so that the target SN can obtain the inactivity status information. The target SN may release or suspend lower layers for a communication with the wireless device based on the inactivity status information upon receiving the second RRC message.

FIG. 14 shows an example of a signal flow for handling UE in inactive state in a PSCell change scenario according to an embodiment of the present disclosure.

Referring to FIG. 14, in step S1401, the wireless device may receive, from the MN, a conditional PSCell mobility command comprising a PSCell mobility condition.

In step S1403, the wireless device may perform a random access towards a target SN for a PSCell mobility to the target SN based on that the PSCell mobility condition is satisfied for a PSCell related to the target SN.

In step S1405, the wireless device may transmit, to the MN, a first radio resource control (RRC) message for informing that the PSCell mobility is completed.

According to various embodiments, lower layers for a communication with the wireless device may be released or suspended by the target SN based on inactivity status information. The inactivity status information may inform that the wireless device is in an inactive state. The lower layers comprises at least one of a physical (PHY) layer, a media access control (MAC) layer, or a radio link control (RLC) layer.

According to various embodiments, the inactivity status information may be stored in the target SN before the random access is performed.

According to various embodiments, the first RRC message may comprise the inactivity status information.

According to various embodiments, the lower layers for the communication with the wireless device may be released or suspended by the target SN based on the inactivity status information upon the target SN receiving the first RRC message.

According to various embodiments, the wireless device may, after transmitting the first RRC message, transmit a second RRC message comprising the inactivity status information. The lower layers for the communication with the wireless device may be released or suspended by the target SN based on the inactivity status information upon the target SN receiving the second RRC message.

According to various embodiments, the wireless device may receive, from the MN, an indication to enter an inactive state upon a completion of the PSCell mobility.

Figure 15B:
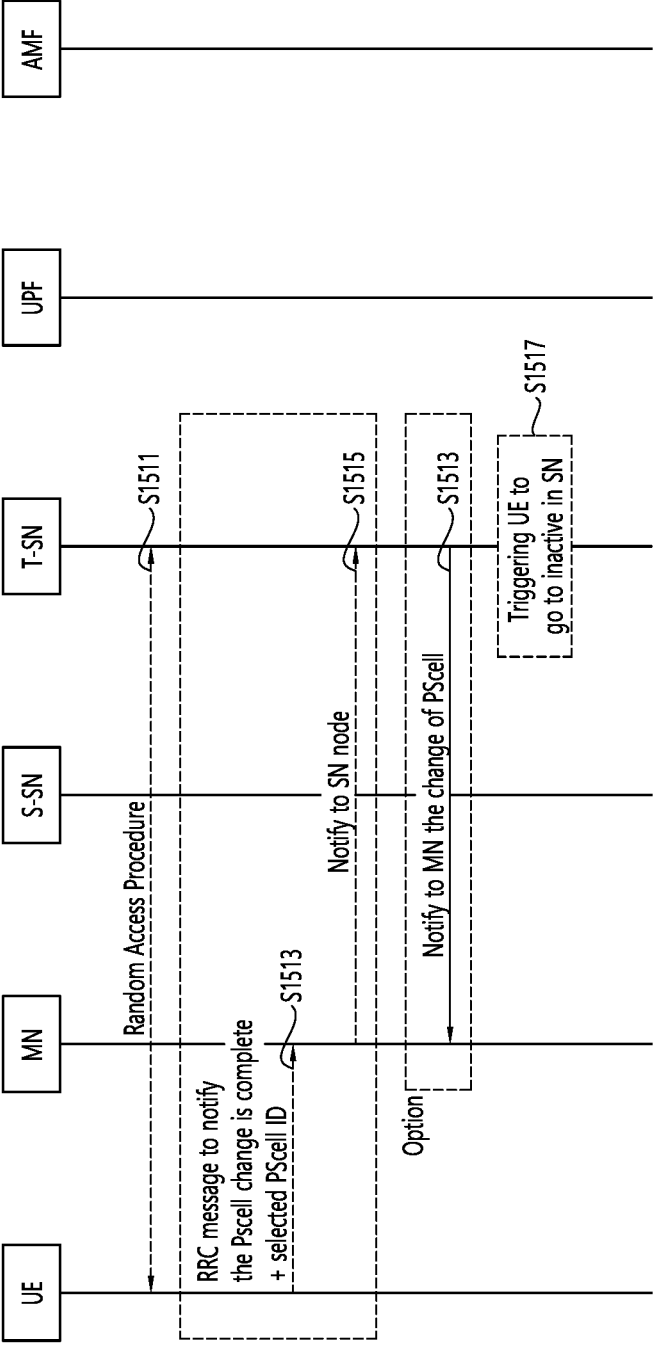

FIGS. 15A and 15B show a first example of a procedure for conditional PSCell change according to an embodiment of the present disclosure.

Referring to FIG. 15A, in step S1501, if a source SN (S-SN) decides to go into inactive state (or S-SN goes to active state) or even when UE is in inactive in S-SN, and S-SN decides to configure the conditional PScell change, S-SN may send an activity notification message (or other message) indicating an activity status for resources owned by the S-SN (or, S-SN terminated bearers), to MN. The activity notification message may comprise at least one of: i) indication for triggering conditional PSCell change, candidate PScell IDs, SN IDs; or ii) criteria/condition for UE triggering the PSCell change (i.e., PSCell change condition for a target PSCell) and corresponding SN RRC (re-)configuration (i.e., target cell configuration for the target PSCell).

In step S1503, at receiving the activity notification message from S-SN, the MN may decide to perform the conditional PSCell change configuration based on the information from S-SN and measurement report that has been received from a UE. Even though there is no indication from S-SN in step S1501, the MN can make its own decision to trigger the PSCell change towards a target SN (T-SN) based the measurement report from the UE and other information.

In step S1505, based on the decision in step S1505, the MN may send SN addition request message (or other Xn message) to the T-SN. The SN addition request message may include at least one of: i) indication of triggering conditional PScell change; or ii) the UE being in/going to be in inactive/suspend state for PScell change.

In step S1507, the T-SN may memorize the UE status (inactive/suspend state) for triggering the UE to be inactive state directly after the PScell change. The SN may send an SN Addition request ACK message (or other message) to the MN. The SN addition request ACK message may comprise criteria/condition for UE triggering the PSCell change and corresponding SN RRC (re-)configuration.

In step S1509, the MN transmit a conditional PScell change configuration (i.e., conditional PSCell change command) to the UE by sending a RRC message (RRC Reconfig/Release/Resume/other RRC message) to the UE. The RRC message may comprise criteria/condition for UE triggering the PScell change, and corresponding SN RRC (re-)configuration. After receiving the RRC message, the UE may evaluate the PSCell change condition for the candidate PSCell(s).

Steps in FIG. 15A may continue to those in FIG. 15B.

In step S1511, when the PSCell change condition is met, the UE may select a PSCell for which the PSCell change condition is met, and perform the random access procedure towards the selected PScell.

In step S1513, the UE may also send an RRC message to the MN for notifying the PSCell change is completed towards the target PSCell. The RRC message may include a PSCell ID of the target PSCell. The target PSCell may be associated with the T-SN.

In step S1515, the MN may forward the RRC message to the T-SN which also include the PSCell ID.

In step S1517, after receiving the RRC message, the T-SN can know that the UE is an inactive/suspend UE in the PScell change procedure based on the UE status information memorized in step S1507. In addition, since there may be no data to be transmitted in the T-SN, the T-SN may trigger the procedures for the UE to go into inactive state directly. For example, the T-SN may release or suspend lower layers for a communication with the UE based on the UE status information memorized in step S1507 indicating that the UE is in an inactive state, after the PSCell change is performed by the UE towards the selected PSCell associated with the T-SN. The lower layers may comprise at least one of PHY layer, MAC layer or RLC layer.

Another optional procedure of step S1513 may be that the T-SN notifies the MN of the PSCell change.

Figure 16A:
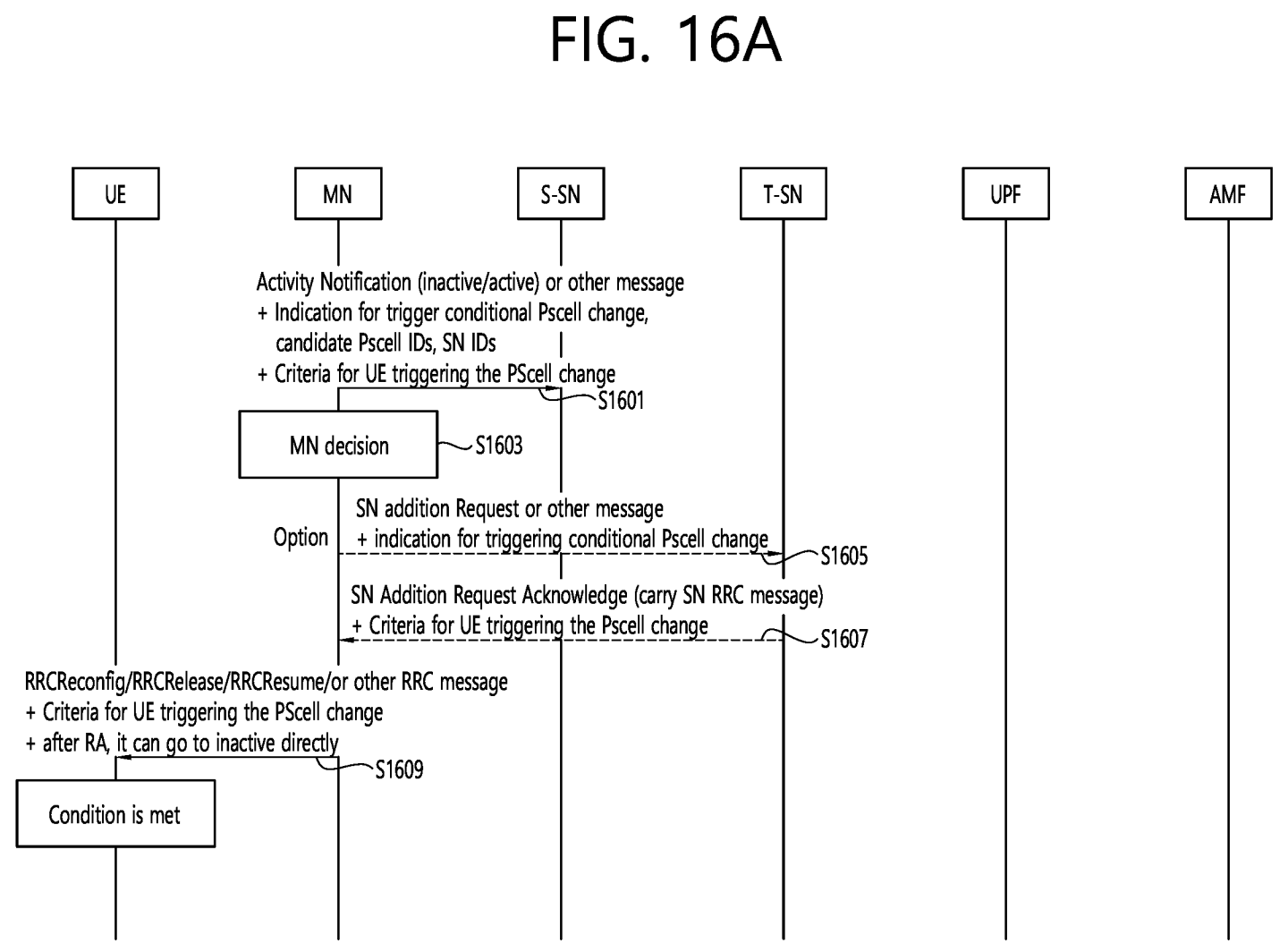
Figure 16B:
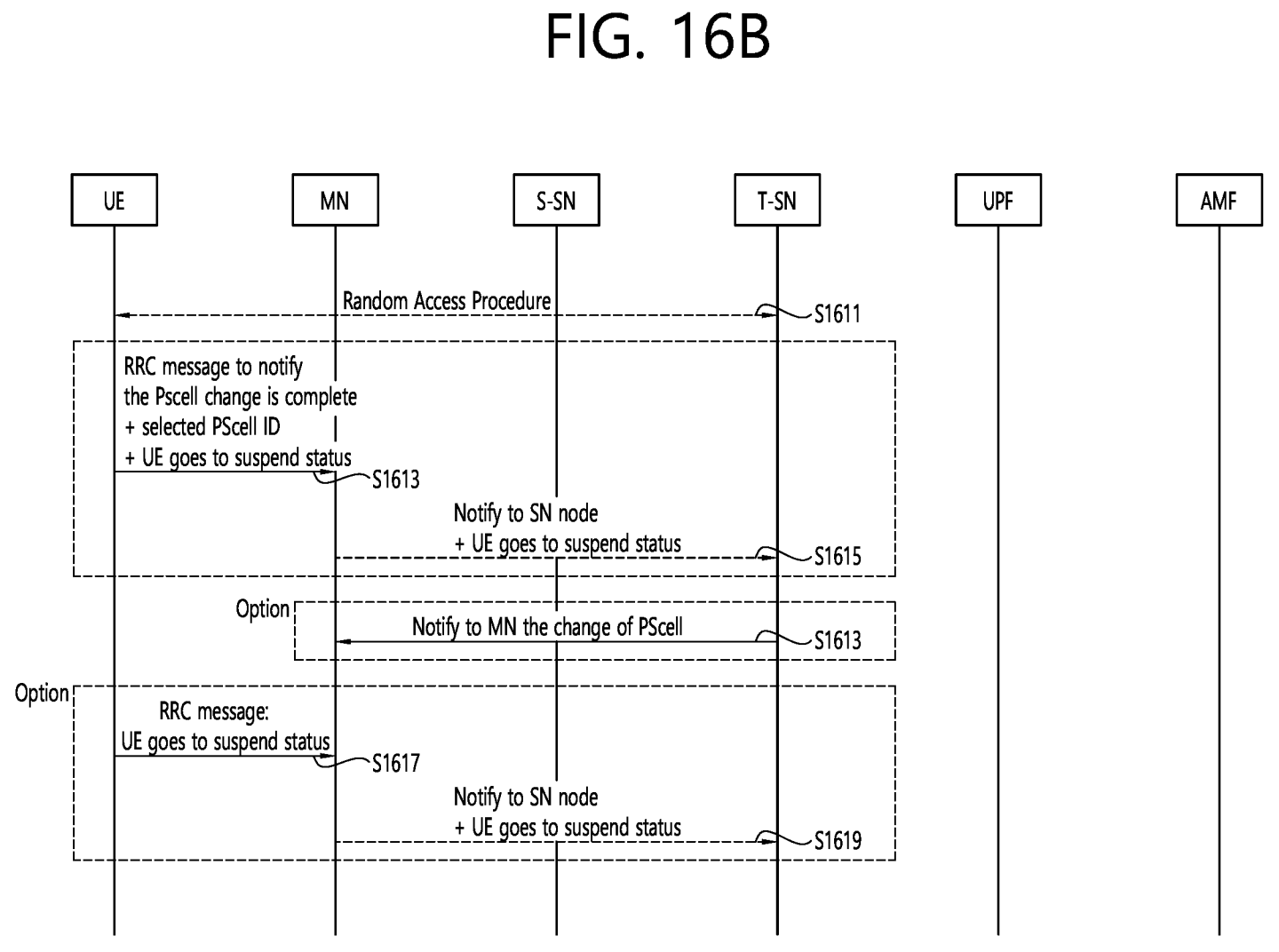

FIGS. 16A and 16B show a second example of a procedure for conditional PSCell change according to an embodiment of the present disclosure.

Referring to FIG. 16A, in step S1601, if S-SN decides to go into inactive state (or S-SN goes to active state) or even when UE is in inactive in S-SN, and S-SN decides to configure the conditional PSCell change, the S-SN may send an activity notification message (or other message) indicating an activity status for resources owned by the S-SN (or, S-SN terminated bearers), to MN. The activity notification message may comprise i) indication for triggering conditional Pscell change, candidate PScell IDs, SN IDs; and/or ii) criteria/condition for UE triggering the PScell change (i.e., PSCell change condition) and corresponding SN RRC configuration (i.e., target cell configuration).

In step S1603, at receiving the activity notification message from the S-SN, the MN may decide to perform a conditional PSCell change configuration based on the information from the S-SN and measurement report that has been received from a UE. Even though there is no indication from the S-SN in step S1601, the MN can make its own decision to trigger the PScell change for T-SN based the measurement report from the UE and other information.

In step S1605, based on the decision in step S1603, the MN may send an SN addition request message (or other Xn message) to the T-SN. The SN addition request message may comprise an indication of triggering conditional PScell change.

In step S1607, the T-SN may send an SN addition request ACK message (or other message) to the MN. The SN addition request ACK message may comprise a criteria/ condition for UE triggering the PScell change and corresponding SN RRC configuration.

In step S1609, the MN may transmit a conditional PScell change configuration (i.e., conditional PSCell change command) to the UE by sending an RRC message (RRC Reconfig/Release/Resume/other RRC message) to the UE. The RRC message may comprise: i) criteria/condition for UE triggering the PScell change (i.e., PSCell change condition); and/or ii) indication that the UE can go to inactive/ suspend state directly after random access procedure. After receiving the conditional PSCell change command, the UE may evaluate the PSCell change condition for a candidate target PSCell.

Steps in FIG. 16A may continue to those in FIG. 16B.

Referring to FIG. 16B, in step S1611, when the PSCell change condition for a PSCell is met, the UE may select the PSCell for which the PSCell change condition is met, and perform a random access procedure towards the selected PSCell.

In step S1613, the UE may send an RRC message to the MN for notifying that the PScell change is completed. The RRC message may further comprise a PSCell ID of the selected PSCell, and/or an indication that the UE is in an inactive state (or, suspend state).

In step S1615, the MN may forward the RRC message to the T-SN.

After receiving the RRC message and after identifying no data to be transmitted in the T-SN, the T-SN may trigger procedures to the UE to go into inactive state directly. For example, the T-SN may release or suspend lower layers for a communication with the UE based on the indication that the UE is in an inactive state (or, suspend state) received from the MN in step S1615, after the PSCell change is performed by the UE towards the selected PSCell associated with the T-SN. The lower layers may comprise at least one of PHY layer, MAC layer or RLC layer.

Another optional procedure of step S1613 may be that the T-SN notifies the MN of the PSCell change.

According to various embodiments, after the random access procedure, the UE may go to suspend state directly. Thus, in step S1613 and S1615, the UE may add an indication "UE goes to suspend state" in the RRC message in step S1613, and the X2/Xn message in step S1615 may comprise the indication "UE goes to suspend state". If no data is to be transmitted in the T-SN side, the T-SN may perform the corresponding procedure (i.e., going into the inactive/suspend state for the UE). For example, the T-SN may release or suspend lower layers for a communication with the UE based on the indication that the UE is in an inactive state (or, suspend state) received from the MN in step S1615, after the PSCell change is performed by the UE towards the selected PSCell associated with the T-SN. The lower layers may comprise at least one of PHY layer, MAC layer or RLC layer.

If the indication "UE goes to suspend state" is not included in the messages in steps S1613 and S1615, the UE may be in connected mode for a while. After that, the UE may go to suspend/inactive state. Then, in step S1617, another RRC message with the indication "UE goes to suspend state" may be sent to the MN, and in step S1619, this message may be finally forwarded to the T-SN. On receiving the message, the T-SN may perform the corresponding network behavior for going to suspend/inactive state. For example, the T-SN may release or suspend lower layers for a communication with the UE based on the indication that the UE is in an inactive state (or, suspend state) received from the MN in step S1619, after the PSCell change is performed by the UE towards the selected PSCell associated with the T-SN. The lower layers may comprise at least one of PHY layer, MAC layer or RLC layer.

All the messages illustrated in various figures in the present disclosure are examples, but they are not limited. That is, new messages can be defined to realize the same goal.

Hereinafter, an apparatus for a base station in a wireless communication system, according to various embodiments of the present disclosure, will be described. The base station may be a target SN for a PSCell mobility of a wireless device from a source SN.

For example, the base station may include at least one processor, a transceiver, and a memory.

For example, the at least one processor may be configured to be coupled operably with the memory and the transceiver.

The at least one processor may be configured to control the transceiver to receive, from an MN, a message for informing a trigger of a PSCell mobility. The at least one processor may be configured to obtain inactivity status information informing that the wireless device is in an inactive state. The at least one processor may be configured to release or suspend lower layers for a communication with the wireless device based on the inactivity status information, after the PSCell mobility of the wireless device to the target SN is completed. The lower layers may comprise at least one of physical layer, MAC layer or RLC layer.

The at least one processor may be configured to control the transceiver to receive, from the MN, an SN addition request message comprising the inactivity status information.

The SN addition request message may further comprise the message for informing a trigger of the PSCell mobility.

The at least one processor may be configured to store the inactivity status information included in the SN addition request message. The at least one processor may be configured to control the transceiver to transmit an SN addition request acknowledge (ACK) message as a response for the SN addition request message.

The at least one processor may be configured to store the inactivity status information included in the SN addition request message based on the message for informing a trigger of the PSCell mobility.

The at least one processor may be configured to control the transceiver to transmit, to the MN, information for a PSCell mobility condition. The at least one processor may be configured to perform a random access procedure with the wireless device based on that the PSCell mobility condition is satisfied for a PSCell related to the target SN.

The at least one processor may be configured to control the transceiver to, after performing the random access procedure, transmit a message informing that the PSCell mobility is completed to the MN.

The at least one processor may be configured to control the transceiver to, after performing the random access procedure, receive a radio resource control (RRC) message for informing that the PSCell mobility is completed from the MN. The at least one processor may be configured to release or suspend lower layers for a communication with the wireless device based on the inactivity status information upon receiving the RRC message.

The RRC message may comprise the inactivity status information. The at least one processor may be configured to identify the inactivity status information in the RRC message.

The at least one processor may be configured to control the transceiver to, after performing the random access procedure, receive a first radio resource control (RRC) message for informing that the PSCell mobility is completed from the MN. The at least one processor may be configured to control the transceiver to receive a second RRC message comprising the inactivity status information. The at least one processor may be configured to identify the inactivity status information in the second RRC message. The at least one processor may be configured to release or suspend lower layers for a communication with the wireless device based on the inactivity status information upon receiving the second RRC message.

Hereinafter, an apparatus for a wireless device in a wireless communication system, according to various embodiments of the present disclosure, will be described. The wireless device may be served by a MN and a SN in DC.

For example, the wireless device may include at least one processor, a transceiver, and a memory.

For example, the at least one processor may be configured to be coupled operably with the memory and the transceiver.

The at least one processor may be configured to control the transceiver to receive, from the MN, a conditional PSCell mobility command comprising a PSCell mobility condition. The at least one processor may be configured to evaluate the PSCell mobility condition based on a measurement on one or more candidate PSCells. The at least one processor may be configured to perform a random access towards a target SN for a PSCell mobility to the target SN based on that the PSCell mobility condition is satisfied for a PSCell related to the target SN. The at least one processor may be configured to control the transceiver to transmit, to the MN, a first radio resource control (RRC) message for informing that the PSCell mobility is completed. Lower layers for a communication with the wireless device may be released or suspended by the target SN based on inactivity status information. The inactivity status information may inform that the wireless device is in an inactive state. The lower layers may comprise at least one of a physical (PHY) layer, a media access control (MAC) layer, or a radio link control (RLC) layer.

The inactivity status information may be stored in the target SN before the random access is performed.

The first RRC message may comprise the inactivity status information.

The lower layers for the communication with the wireless device may be released or suspended by the target SN based on the inactivity status information upon the target SN receiving the first RRC message.

The at least one processor may be configured to control the transceiver to, after transmitting the first RRC message, transmit a second RRC message comprising the inactivity status information. The lower layers for the communication with the wireless device may be released or suspended by the target SN based on the inactivity status information upon the target SN receiving the second RRC message.

The at least one processor may be configured to control the transceiver to receive, from the MN, an indication to enter an inactive state upon a completion of the PSCell mobility.

Hereinafter, a processor for a base station in a wireless communication system, according to some embodiments of the present disclosure, will be described. The base station may be a target SN for a PSCell mobility of a wireless device from a source SN.

The processor may be configured to receive, from an MN, a message for informing a trigger of a PSCell mobility. The processor may be configured to obtain information informing that the wireless device is in an inactive state. The processor may be configured to release or suspend lower layers for a communication with the wireless device based on the inactivity status information, after the PSCell mobility of the wireless device to the target SN is completed. The lower layers may comprise at least one of physical layer, MAC layer or RLC layer.

Hereinafter, a processor for a wireless device in a wireless communication system, according to some embodiments of the present disclosure, will be described. The wireless device may be served by a MN and a SN in DC.

The processor may be configured to receive, from the MN, a conditional PSCell mobility command comprising a PSCell mobility condition. The processor may be configured to evaluate the PSCell mobility condition based on a measurement on one or more candidate PSCells. The processor may be configured to perform a random access towards a target SN for a PSCell mobility to the target SN based on that the PSCell mobility condition is satisfied for a PSCell related to the target SN. The processor may be configured to transmit, to the MN, a first radio resource control (RRC) message for informing that the PSCell mobility is completed. Lower layers for a communication with the wireless device may be released or suspended by the target SN based on inactivity status information. The inactivity status information may inform that the wireless device is in an inactive state. The lower layers may comprise at least one of a physical (PHY) layer, a media access control (MAC) layer, or a radio link control (RLC) layer.

Hereinafter, a non-transitory computer-readable medium has stored thereon a plurality of instructions for a base station in a wireless communication system, according to some embodiments of the present disclosure, will be described. The base station may be a target SN for a PSCell mobility of a wireless device from a source SN.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the base station to: receive, from a master node (MN), a message for informing a trigger of the PSCell mobility; obtain inactivity status information informing that the wireless device is in an inactive state; and release or suspending lower layers for a communication with the wireless device based on the inactivity status information after the PSCell mobility of the wireless device to the target SN is completed. The lower layer comprises at least one of a physical (PHY) layer, a media access control (MAC) layer, or a radio link control (RLC) layer.

Hereinafter, a non-transitory computer-readable medium has stored thereon a plurality of instructions for a wireless device in a wireless communication system, according to some embodiments of the present disclosure, will be described. The wireless device may be served by a MN and a SN in DC.

The stored a plurality of instructions may cause the wireless device to: receive, from the MN, a conditional PSCell mobility command comprising a PSCell mobility condition; evaluate the PSCell mobility condition based on a measurement on one or more candidate PSCells; perform a random access towards a target SN for a PSCell mobility to the target SN based on that the PSCell mobility condition is satisfied for a PSCell related to the target SN; and transmit, to the MN, a first radio resource control (RRC) message for informing that the PSCell mobility is completed. Lower layers for a communication with the wireless device may be released or suspended by the target SN based on inactivity status information. The inactivity status information may inform that the wireless device is in an inactive state. The lower layer may comprise at least one of a physical (PHY) layer, a media access control (MAC) layer, or a radio link control (RLC) layer.

The present disclosure may have various advantageous effects.

For example, allowing the PSCell change for an inactive state UE can make a good cell be ready for an inactive UE in advance. When the data packets arrive for a transmission, a cell with good quality can make the service better. UE's service experience can be enhanced. The solution can also avoid the sudden cell change when packets should be transmitted.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a target secondary node from a master node, a request message for a conditional mobility of a wireless device from a source secondary node to the target secondary node;

transmitting, by the target secondary node to the master node, an acknowledgement message comprising a configuration related to the target secondary node;

receiving, by the target secondary node from the master node, a complete message for the configuration related to the target secondary node based on a condition for the conditional mobility being met, wherein at least one of the request message or the complete message comprises inactivity status information that the wireless device is in an inactive state; and suspending, by the target secondary node, resources for a communication with the wireless device based on the inactivity status information.

2. The method of claim 1, wherein the request message comprises the inactivity status information.

3. The method of claim 1, wherein the request message is a secondary node addition request message, and wherein the acknowledgement message is a secondary node addition request acknowledgement message.

4. The method of claim 1, further comprising storing, by the target secondary node, the inactivity status information.

5. The method of claim 1, further comprising performing, by the target secondary node, a random access procedure with the wireless device based on the condition for the conditional mobility being met.

6. The method of claim 5, further comprising after performing the random access procedure, transmitting, by the target secondary node to the master node, a message comprising information for a completion of the conditional mobility.

7. The method of claim 1, wherein the suspending of the resources for a communication with the wireless device comprises suspending of the resources for a communication with the wireless device upon receiving the complete message.

8. The method of claim 1, wherein the complete message comprises the inactivity status information.

9. A method comprising:

receiving, by a wireless device from a master node, a reconfiguration message comprising a condition for a conditional mobility of the wireless device from a source secondary node to a target secondary node, and a configuration related to the target secondary node; and transmitting, by the wireless device to the master node, a complete message for the configuration related to the target secondary node based on the condition for the conditional mobility being met, wherein a request message for the conditional mobility is transmitted from the master node to the target secondary node, wherein an acknowledgement message comprising the configuration related to the target secondary node is transmitted from the target secondary node to the master node, wherein at least one of the request message or the complete message comprises inactivity status information that the wireless device is in an inactive state, and wherein resources for a communication with the target secondary node are suspended by the target secondary node based on the inactivity status information.

10. The method of claim 9, wherein the request message comprises the inactivity status information.

11. The method of claim 9, wherein the complete message comprises the inactivity status information.

12. The method of claim 9, wherein the resources for a communication with the target secondary node are suspended by the target secondary node based on the target secondary node receiving the complete message.

13. A target secondary node comprising:

a transceiver;

a memory; and at least one processor operatively coupled to the transceiver and the memory, wherein the memory stores instructions that, based on being executed by the at least one processor, perform operations comprising:

receiving, from a master node, a request message for a conditional mobility of a wireless device from a source secondary node to the target secondary node;

transmitting, to the master node, an acknowledgement message comprising a configuration related to the target secondary node;

receiving, from the master node, a complete message for the configuration related to the target secondary node based on a condition for the conditional mobility being met, wherein at least one of the request message or the complete message comprises inactivity status information that the wireless device is in an inactive state; and suspending resources for a communication with the wireless device based on the inactivity status information.

* * * * *